(12) United States Patent
Arimilli et al.

(10) Patent No.: US 7,130,967 B2
(45) Date of Patent: Oct. 31, 2006

(54) METHOD AND SYSTEM FOR SUPPLIER-BASED MEMORY SPECULATION IN A MEMORY SUBSYSTEM OF A DATA PROCESSING SYSTEM

(75) Inventors: Ravi Kumar Arimilli, Austin, TX (US); Sanjeev Ghai, Round Rock, TX (US); Warren Edward Maule, Cedar Park, TX (US)

(73) Assignee: International Business Machines Corporation, Armonk, NY (US)

( * ) Notice: Subject to any disclaimer, the term of this patent is extended or adjusted under 35 U.S.C. 154(b) by 312 days.

(21) Appl. No.: 10/733,948

(22) Filed: Dec. 10, 2003

(65) Prior Publication Data

US 2005/0132147 A1 Jun. 16, 2005

(51) Int. Cl.
*G06F 12/00* (2006.01)

(52) U.S. Cl. .......................... 711/137; 711/5; 711/163; 711/154

(58) Field of Classification Search ...................... None
See application file for complete search history.

(56) References Cited

U.S. PATENT DOCUMENTS

| | | | |
|---|---|---|---|
| 5,860,106 A * | 1/1999 | Domen et al. | 713/324 |
| 5,889,714 A * | 3/1999 | Schumann et al. | 365/203 |
| 6,041,400 A * | 3/2000 | Ozcelik et al. | 712/35 |
| 6,256,724 B1 | 7/2001 | Hocevar et al. | |
| 6,697,919 B1 * | 2/2004 | Gharachorloo et al. | 711/141 |
| 6,748,498 B1 * | 6/2004 | Gharachorloo et al. | 711/141 |
| 2002/0046327 A1 * | 4/2002 | Gharachorloo et al. | 711/141 |
| 2002/0184430 A1 | 12/2002 | Ukai et al. | |
| 2003/0023794 A1 * | 1/2003 | Venkitakrishnan et al. | 710/105 |
| 2003/0069920 A1 * | 4/2003 | Melvin et al. | 709/108 |
| 2003/0097389 A1 * | 5/2003 | Saulsbury et al. | 708/445 |
| 2004/0071152 A1 * | 4/2004 | Wolrich et al. | 370/420 |
| 2004/0103218 A1 * | 5/2004 | Blumrich et al. | 709/249 |

* cited by examiner

*Primary Examiner*—Mano Padmanabhan
*Assistant Examiner*—Horace L. Flournoy
(74) *Attorney, Agent, or Firm*—Casimer K. Salys; Dillon & Yudell LLP

(57) ABSTRACT

A data processing system includes one or more processing cores, a system memory having multiple rows of data storage, and a memory controller that controls access to the system memory and performs supplier-based memory speculation. The memory controller includes a memory speculation table that stores historical information regarding prior memory accesses. In response to a memory access request, the memory controller directs an access to a selected row in the system memory to service the memory access request. The memory controller speculatively directs that the selected row will continue to be energized following the access based upon the historical information in the memory speculation table, so that access latency of an immediately subsequent memory access is reduced.

17 Claims, 15 Drawing Sheets

METHOD AND SYSTEM FOR SUPPLIER-BASED MEMORY SPECULATION IN A MEMORY SUBSYSTEM OF A DATA PROCESSING SYSTEM

CROSS-REFERENCE TO RELATED APPLICATION

This application is related to U.S. patent application Ser. No. 10/733,953, which is assigned to the assignee of the present application, filed on even date herewith and incorporated herein by reference in its entirety.

BACKGROUND OF THE INVENTION

1. Technical Field

The present invention relates in general to data processing and in particular to data processing systems and improved memory subsystems and memory controllers for data processing systems. Still more particularly, the present invention relates to a method and system for thread-based speculation in a memory subsystem of a data processing system.

2. Description of the Related Art

Symmetric Multi-Processor (SMP) computer systems have conventionally been implemented with multiple processor chips coupled by a tri-state bus to a single common memory controller controlling access to one or more DIMMs (Dual Inline Memory Modules). Because of the lack of scalability and high access latency associated with this conventional configuration, more recent multiprocessor computer systems have migrated to a system-on-a-chip (SOC) paradigm in which multiple processing units are coupled together by a switch and each processing unit die contains multiple processor cores supported by one or more levels of cache memory and an integrated memory controller coupled to multiple external DIMMs. Because each SOC processing unit die includes its own integrated memory controller, scalability is improved over earlier SMP architectures. However, although absolute memory latency is reduced for the percentage of memory accesses to addresses mapped to physically closer DIMMs, improvements in average memory access latency for current SOC-based system designs still does not scale with ever-increasing processor clock frequencies.

In addition to the foregoing memory subsystem design trends, enhancements have also been made to processor core designs to decrease the average cycles per instruction (CPI) by improving the manner in which the processor core manages memory accesses. In particular, these enhancements include support for highly out-of-order instruction execution, multilevel branch speculation, simultaneous multithreading (SMT), and speculative data and instruction prefetching. The intent of each of these features is to mask apparent memory access latency by initiating retrieval of data from the memory subsystem in advance of need. All of these enhancements reflect a common "consumer-controlled" design philosophy in which an increasing amount of logic in the processor core is devoted to controlling access to the memory subsystem, resulting in more complex and larger processor cores.

SUMMARY OF THE INVENTION

While the above-described enhancements to processor cores provide substantial performance benefits given current and near-term memory and processor technologies and operating frequencies, the present invention recognizes the introduction of further complexity in processor core designs is unlikely to yield an improvement in average memory access latency that will scale with projected future increases in processor core operating frequencies. Accordingly, the present invention introduces an innovative method, memory controller, and data processing system implementing at least partial "supplier-based" control of the memory subsystem in order to further reduce apparent memory access latency.

In one embodiment, a data processing system includes one or more processing cores, a system memory having multiple rows of data storage, and a memory controller that controls access to the system memory and implements supplier-based memory speculation. The memory controller includes a memory speculation table that stores historical information regarding prior memory accesses. In response to a memory access request, the memory controller directs an access to a selected row in the system memory to service the memory access request. The memory controller directs that the selected row be speculatively energized following the access based upon the historical information in the memory speculation table, so that access latency of an immediately subsequent memory access is reduced.

All objects, features, and advantages of the present invention will become apparent in the following detailed written description.

BRIEF DESCRIPTION OF THE DRAWINGS

The novel features believed characteristic of the invention are set forth in the appended claims. However, the invention, as well as a preferred mode of use, will best be understood by reference to the following detailed description of an illustrative embodiment when read in conjunction with the accompanying drawings, wherein:

DETAILED DESCRIPTION OF ILLUSTRATIVE EMBODIMENT

Figure 1:
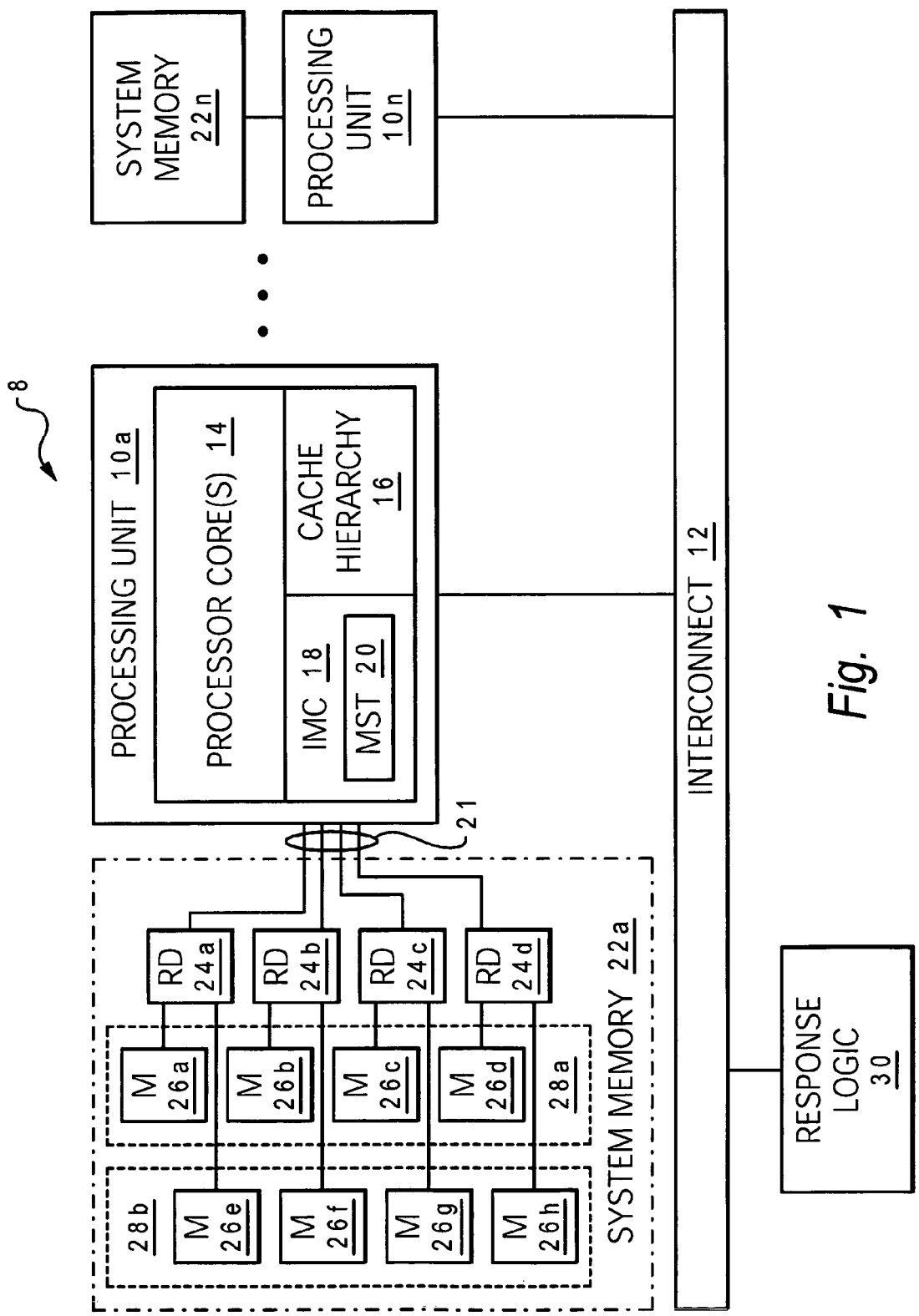
FIG. 1 is a high-level block diagram of a data processing system in accordance with one embodiment of the present invention.

With reference now to the figures and, in particular, with reference to FIG. 1, there is illustrated a high level block diagram of an exemplary data processing system 8 providing reduced memory access latency in accordance with one embodiment of the present invention. As depicted, data processing system 8 includes a plurality of processing units 10a–10n coupled for communication by an interconnect 12. Interconnect 12 may be implemented, for example, by one or more address, data and control buses, by a switching fabric, or by a interconnect network including bused, switched, and/or other communication links. As is well known in the art, interconnect 12 may be further coupled to additional unillustrated components, such as bridges and adapters, which support communication via input/output (I/O) ports and the attachment of peripheral devices (e.g., non-volatile storage devices) and additional processing nodes.

Each processing unit 10 includes one or more processor cores 14 that can each independently and concurrently execute one or more program threads. Each processing unit 10 further includes a cache hierarchy 16 coupled to processor cores 14 to provide low latency storage for data and instructions likely to be accessed by processor cores 14. Cache hierarchy 16 may include, for example, separate bifurcated level one (L1) instruction and data caches for each processor core 14, a large level two (L2) cache shared by multiple processor cores 14, and optionally one or more additional levels of inline or lookaside cache memory. Each such cache may include a conventional (or unconventional) cache array, cache directory and cache controller. Cache hierarchy 16 preferably implements the well known Modified, Exclusive, Shared, Invalid (MESI) cache coherency protocol or a variant thereof within its cache directories to track the coherency states of cached data and instructions. In this manner, memory coherency may be maintained across all cache hierarchies 16 within data processing system 8.

The cache hierarchy 16 and processor cores 14 of each processing unit 10 are further coupled to an integrated memory controller (IMC) 18 that controls access to an external system memory 22 coupled to the processing unit 10 by a high frequency, high bandwidth memory bus 21. System memories 22a–22n of all of processing units 10 collectively form the lowest level of volatile memory within data processing system 8, which is generally accessible to all processing units 10 via request transactions issued on interconnect 12.

As will be appreciated by those skilled in the art, memory coherency is commonly maintained in computer systems such as data processing system 8 through either a directory-based or a snoop-based coherency protocol. Although either memory coherency methodology may be employed in accordance with the present invention, it will hereafter be assumed that data processing system 8 utilizes a snoop-based coherency protocol.

According to the snoop-based protocol, each processing unit 10 snoops each request transaction (e.g., read requests, read-with-intent-to-modify requests, invalidation requests, cache flush requests, etc.) issued on interconnect 12. In response to snooping a request transaction, each processing unit 10 furnishes a snoop response, indicating its ability (or inability) to process the request transaction, and optionally, one or more data operations that the processing unit 10 proposes to perform in response to the request transaction (e.g., supplying requested data, invalidating cached data, flushing cached data, etc.). These snoop responses are then compiled by response logic 30 to produce a combined response provided to all processing units 10 (and other agents, if any) coupled to interconnect 12 in order to direct servicing of the request transaction.

Although illustrated separately for clarity, response logic 30 may be integrated within a particular processing unit 10 (or other agent) or distributed among multiple processing units 10 (or other agents). In cases in which response logic 30 is implemented in a distributed manner, portions of response logic 30 may generate partial combined responses from the snoop responses, which partial combined responses are then combined to form the overall combined response of data processing system 8.

Turning now more specifically to system memories 22, in an exemplary embodiment, each system memory 22 is implemented with multiple redrive (RD) chips 24a–24d, each providing address and data connections for multiple (in this case two) Dynamic Random Access Memory (DRAM) Dual Inline Memory Modules (DIMMs) 26. That is, RD chip 24a is connected to DIMMs 26a, 26e; RD chip 24b is connected to DIMMs 26b, 26f; RD chip 24c is connected to DIMMs 26c, 26g; and RD chip 24d is connected to DIMMs 26d, 26h. The DIMMs 26 comprising each system memory 22 are further organized into multiple "ranks" 28a–28b each containing one DIMM 26 connected to each of RD chips 24a–24d. For example, rank 28a includes DIMMs 26a-26d, and rank 28b includes DIMMs 26e–26h. Real memory addresses may be "striped" across the DIMMs 26 comprising each rank 28 so that access latency for full cache line memory accesses is reduced.

Figure 2:
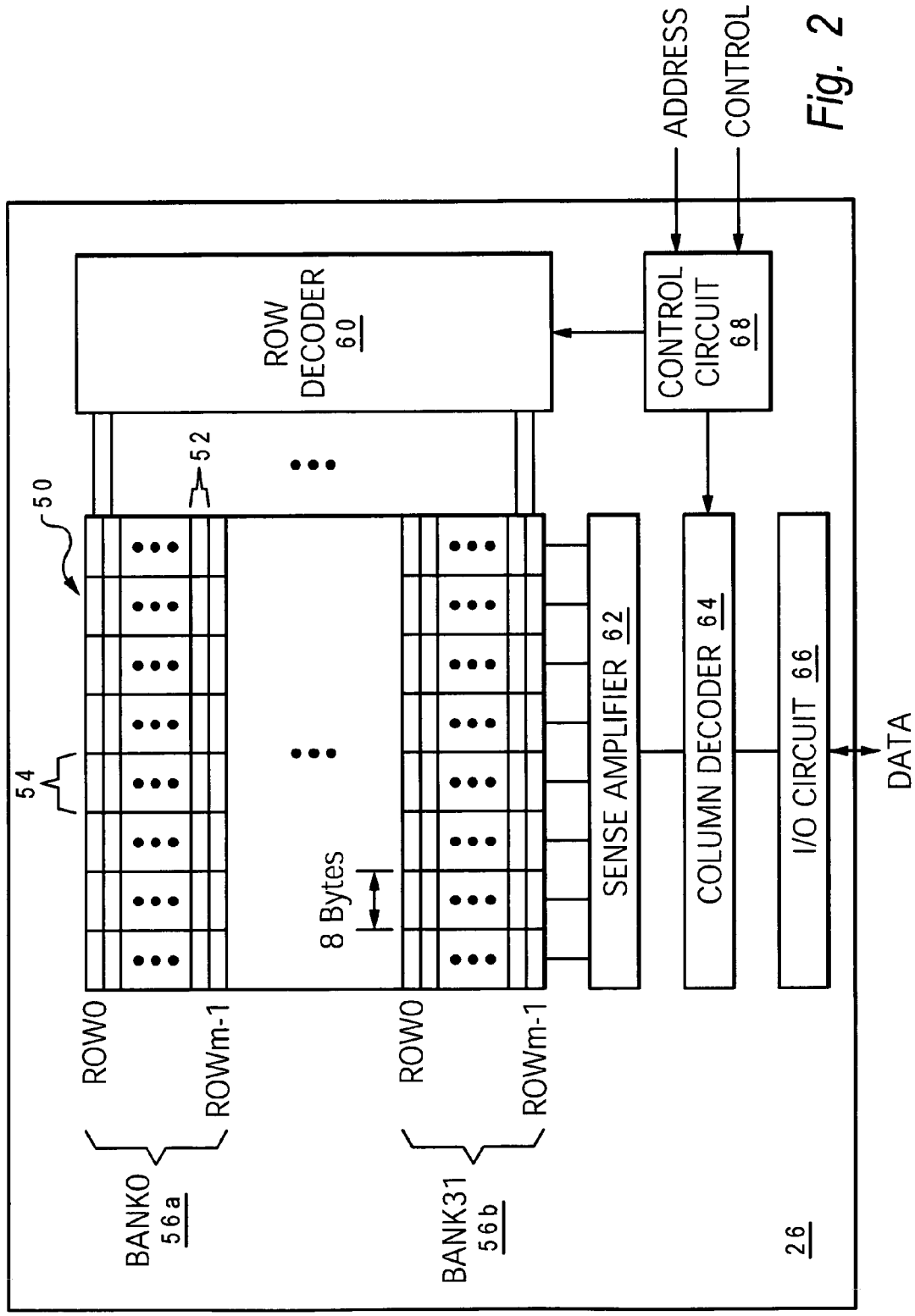
FIG. 2 is a high-level block diagram of an exemplary dual in-line memory module (DIMM) that may be employed in the data processing system of FIG. 1.

Referring now to FIG. 2, there is depicted a more detailed block diagram of an exemplary implementation of a DIMM 26 within data processing system 8 of FIG. 1. As shown, DIMM 26 includes a DRAM memory array 50 containing a number of rows 52 and columns 54 of DRAM memory cells, with each combination of a row and column corresponding to a particular unique real memory address. As indicated, in the exemplary embodiment, each column 54 is eight bytes (64 bits) wide, meaning that a memory access specifying the real address of a 32-byte word will be serviced by reference to one column (8 bytes) of data from each of the four DIMMs 26 within the relevant rank 28. In order to provide enhanced access bandwidth, rows 52 are organized into multiple (in this example, 32) banks 56 (e.g., 56a, 56b) of m rows 52, and memory array 50 supports concurrent access to one row 52 in each of the 32 banks. As will become apparent, the width of memory columns, the number of banks and ranks, and implementation-dependent parameters described herein will vary between embodiments of the invention.

DIMM 26 further includes a control circuit 68, row decoder 60, sense amplifier 62, column decoder 64 and I/O circuit 66 that are utilized to perform read and write accesses to memory array 50 in response to control signals and addresses (and if a write access, data) received from IMC 18 via a RD chip 24. IMC 18 initiates a memory access to a DIMM 26 by asserting or deasserting a read/write (R/W) control line and supplying a real address to an RD chip 24, which in turn, supplies the control signal and real address to the DIMM 26. Control circuit 68 within the DIMM 26 latches at least the row portion of a real address presented by the associated RD chip 24 in response to assertion of a Row Access Select (RAS) line. Row decoder 60 then decodes row portion of the real address to read out a particular row 52 within memory array 50. If the row address resolves to a different row than the immediate previous access to memory array 50, control circuit 68 precharges sense amplifiers 62 during a precharge period ($t_{RP}$).

Control circuit 68 similarly latches a column portion of the real address of interest in response to assertion of a Column Access Select (CAS) line, which follows the assertion of the RAS line by a latency period $t_{RCD}$ in order to permit the row signal to settle. The column portion of the real address is decoded by column decoder 64, which transfers the 8 bytes of data associated with the real memory address between the sense amplifier 62 and I/O circuit 66. The period between assertion of CAS and the appearance of correct data at the output pins of I/O circuit 66 is referred to as $t_{CAC}$.

The worst case internal memory access latency ($t_{INT}$) of DIMM 26 (or any conventional DRAM memory) can thus be generally characterized by the sum of $t_{RP}$, $t_{RCD}$, and $t_{CAC}$. From the perspective of a processor core that issues a read transaction, the total access latency includes not only such internal memory access latency ($t_{INT}$), but also additional communication latency ($t_{COM}$). For example, in conventional multiprocessor data processing systems, the memory controller does not initiate access to the system memory until a combined response is received confirming that the read transaction will not be serviced by a lower latency cache memory. A chief reason that conventional multiprocessor data processing systems incur this communication latency, which can total hundreds of processor clock cycles, is to avoid the power consumption occasioned by a memory access that may be rendered unnecessary, for example, by an access to a lower latency cache memory, a snooper retry, etc.

The present invention improves the total access latency experienced by processing units 10 by implementing memory controllers (e.g., IMCs 18) that employ memory speculation to reduce both the internal memory access latency ($t_{INT}$) of DIMMs 26 and communication latency ($t_{COM}$). In a preferred embodiment, each IMC 18 independently performs such memory speculation by reference to a Memory Speculation Table (MST) 20 (FIG. 1) or other mechanism for storing historical access information, as discussed below.

Figure 3:
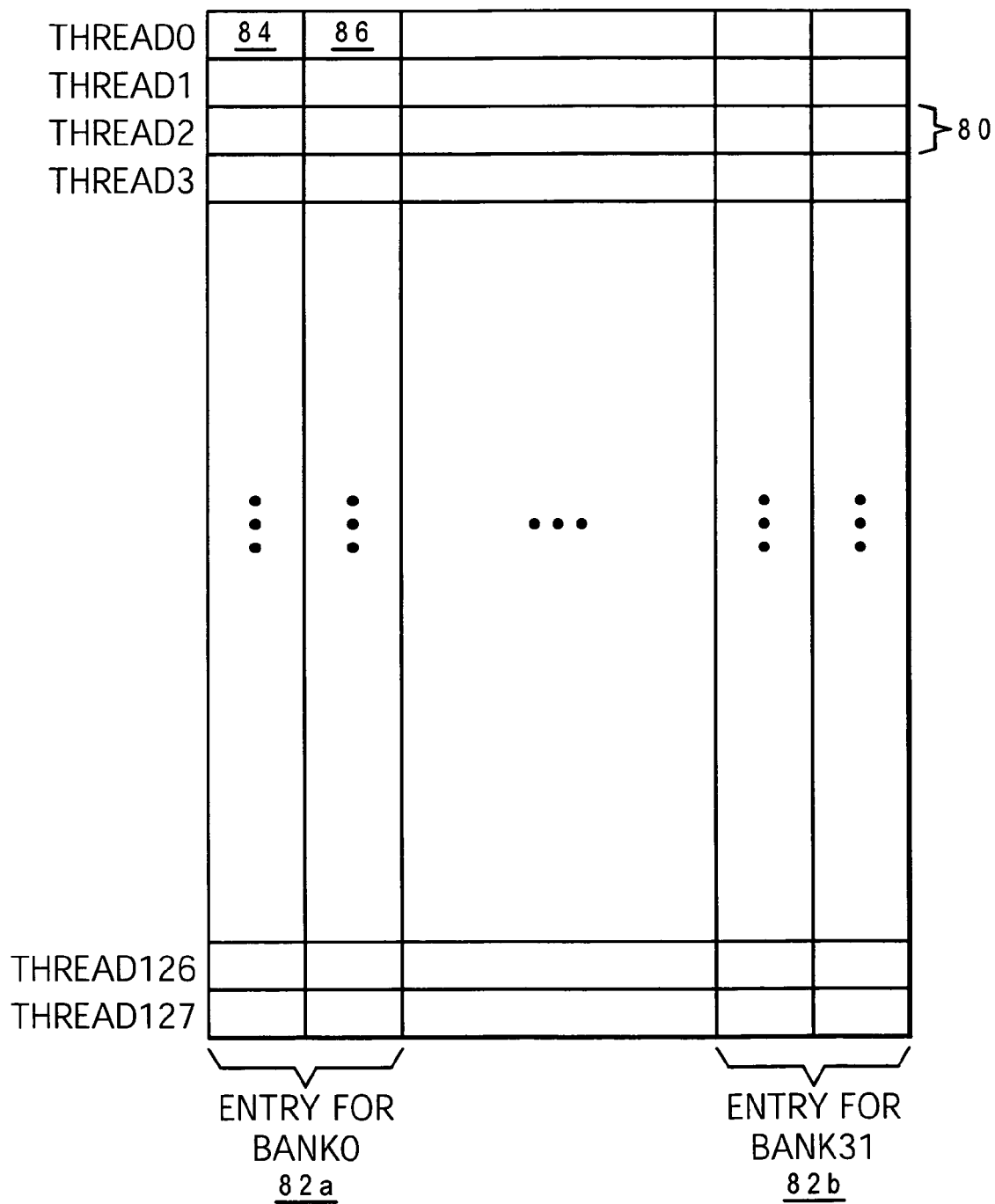
FIG. 3 is a high-level block diagram of a memory speculation table (MST) of a system memory controller in accordance with one embodiment of the present invention.

With reference now to FIG. 3, there is illustrated a block diagram of an illustrative embodiment of a MST 20 in accordance with one embodiment of the present invention. In the depicted embodiment, MST 20 includes a number of rows 80, which are each associated with a respective instance of a class of software entities (e.g., threads, processes or other entitites). In the present example, MST 20 includes 128 rows, one for each thread supported by the operating system (e.g., AIX, Windows, or Linux) of data processing system 8. Each thread is accorded its own row 80 in MST 20 under the general presumption that the access patterns of the various active threads are independent.

Each row 80 in MST 20 contains a number of entries 82 (e.g., 82a, 82b), which each corresponds to a respective bank 56 within DIMMs 26. Each entry 82 includes at least one of, and preferably, both of a timing speculation field 84 and a row speculation field 86. Timing speculation field 84 contains information indicative of whether or not IMC 18 should wait for a selected coherency message (e.g., snoop response, partial combined response, or complete combined response) before initiating a memory access cycle. As described further below, IMC 18 utilizes the information contained in a timing speculation field 84 to reduce communication latency ($t_{COM}$) by speculatively initiating a memory access cycle to service a request transaction in advance of the selected coherency message. Row speculation field 86 contains information indicative of whether or not consecutive memory accesses are likely to map to the same row of a DIMM 26. As discussed hereafter, IMC 18 employs the state information contained in row speculation field 86 to reduce internal memory access latency ($t_{INT}$) by speculatively continuing assertion of RAS following a memory access likely to be followed by a memory access to the same row 52. IMC 18 can selectively employ the two types of speculation independently or in combination on a per-thread basis.

Although timing speculation field 84 can be implemented in a variety of ways (e.g., as a counter), in one embodiment, timing speculation field 84 is implemented as a multiple bit (e.g., 8-bit) history field in which each bit represents a respective one of the immediately previous request transactions received by IMC 18 that had a real address mapping to a storage location in the associated bank number (e.g., Bank 5). A first bit state (e.g., "1") indicates that the associated request transaction was serviced by accessing the relevant one of DIMMs 26a–26h, and a second bit state (e.g., "0") indicates that the request transaction was serviced without accessing the relevant DIMM 26 (e.g., by obtaining requested read data from a cache hierarchy 16). IMC 18 is thus able to determine, based upon historical information, whether or not it is likely that a subsequent access to a particular memory bank by a particular thread will be serviced by accessing system memory 22. Based upon this determination, IMC 18 can selectively and intelligently initiate speculative memory access cycles in response to receipt of request transactions in order to reduce the communication latency ($t_{COM}$) component of overall access latency.

Row speculation field 86 is similarly subject to a number of different implementations. In one exemplary implementation depicted in FIG. 4, each row speculation field 86 contains one or more segments 90 each corresponding to a respective row 52 within the bank 56 for which historical information is recorded. Each segment 90 contains a row identifier (ID) 92 (or row address) identifying the corresponding row 52 and history bits 94 indicating whether or not it would have been beneficial, from a latency perspective, to hold the identified row 52 "open" by continuing to assert RAS following the previous access. As will be appreciated by those skilled in the art, holding a row 52 open between two consecutive accesses to the same row 52 advantageously eliminates at least the RAS-to-CAS latency ($t_{RCD}$) for the second access. Thus, consecutive accesses to the same row 52, which would benefit from holding the row 52 open, can be represented by a first logical state ("1"), and consecutive accesses to different rows in the bank 56 can be represented by a second logical state ("0"). Based upon this historical information, IMC 18 can reduce internal access latency ($t_{INT}$) by speculatively and selectively holding open a row 52 that is likely to be the next row 52 accessed within a given bank 56.

Figure 4:
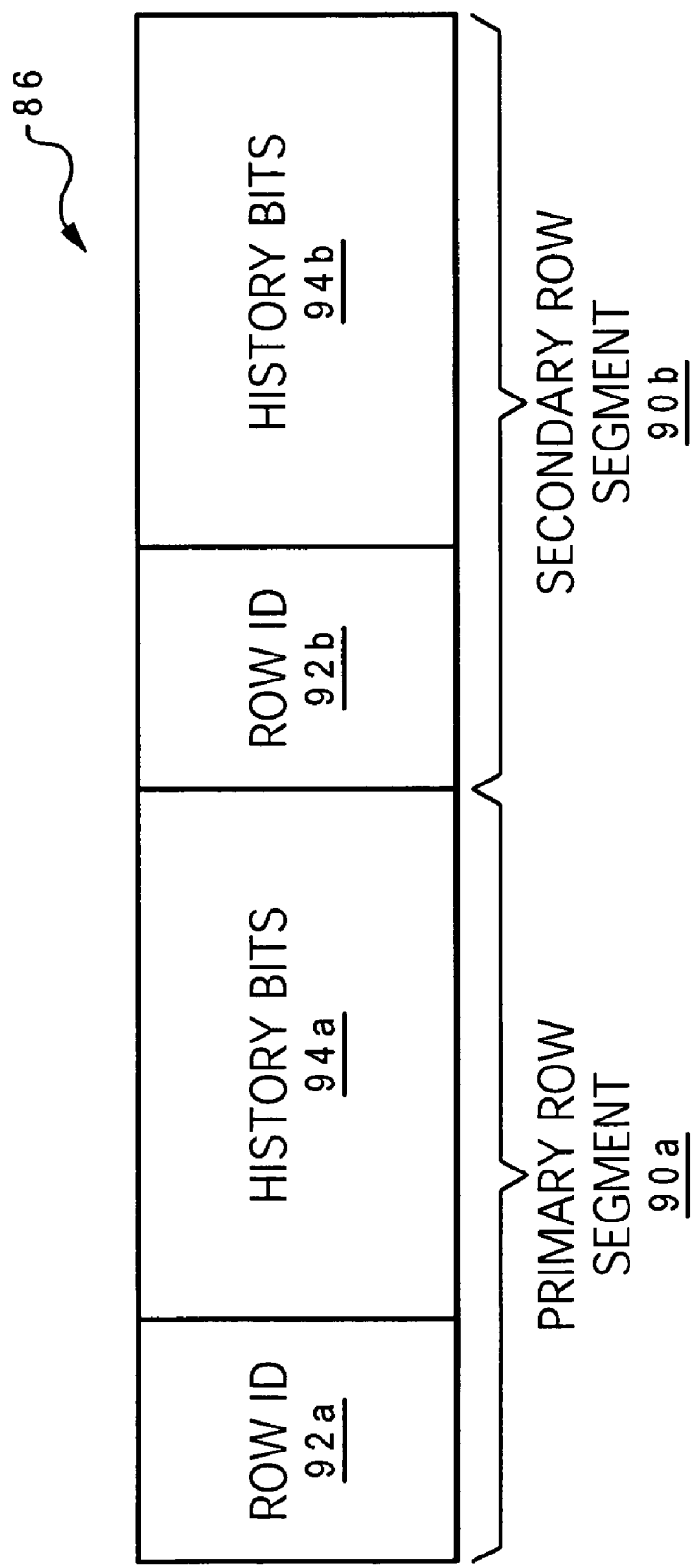
FIG. 4 is a more detailed view of an exemplary embodiment of a row speculation field within the MST of FIG. 3.

As indicated in FIG. 4, in embodiments in which row speculation field 86 contains more than one segment 90, one segment 90a is preferably designated as the "primary"

segment, and a second segment 90b is preferably designated as the "secondary" segment. Primary segment 90a records historical information regarding a "primary" row 52 that IMC 18 may speculatively hold "open" following an access. Secondary segment 90b records historical information regarding a different "secondary" row 52 in the same bank 56 that, due to one or more recent accesses, is a likely candidate for replacing the "primary" row 52.

Each IMC 18 implements a selected (or programmable) replacement methodology for replacing the primary row, and if implemented, the secondary row. For example, in an embodiment in which each segment 90 employs 8 history bits 94 to record historical information about the preceding 8 access to that particular memory bank 56, IMC 18 may replace the secondary row 52 identified in row ID field 92b of secondary row segment 90b in response to two consecutive accesses to rows 52 in the bank 56 other than to the primary and secondary rows 52. IMC 18 may similarly replace the primary row 52 identified in row ID field 92a with the current secondary row 52 in response to history bits 94a indicating at least 4 accesses to the bank 56 that would not benefit by speculatively holding open the primary row 52 (i.e., history bits 94a including at least 4 zeros ("0")).

Depending upon the row prediction algorithm employed by IMC 18, row speculation field 86 may include additional historical information regarding memory accesses to the indicated bank 56. For example, in addition to the latency improvement indication discussed above, IMC 18 may further record whether or not the primary row was speculatively held open for a particular access to the bank 56, and whether or not any another row was held open for that access.

Figure 5A:
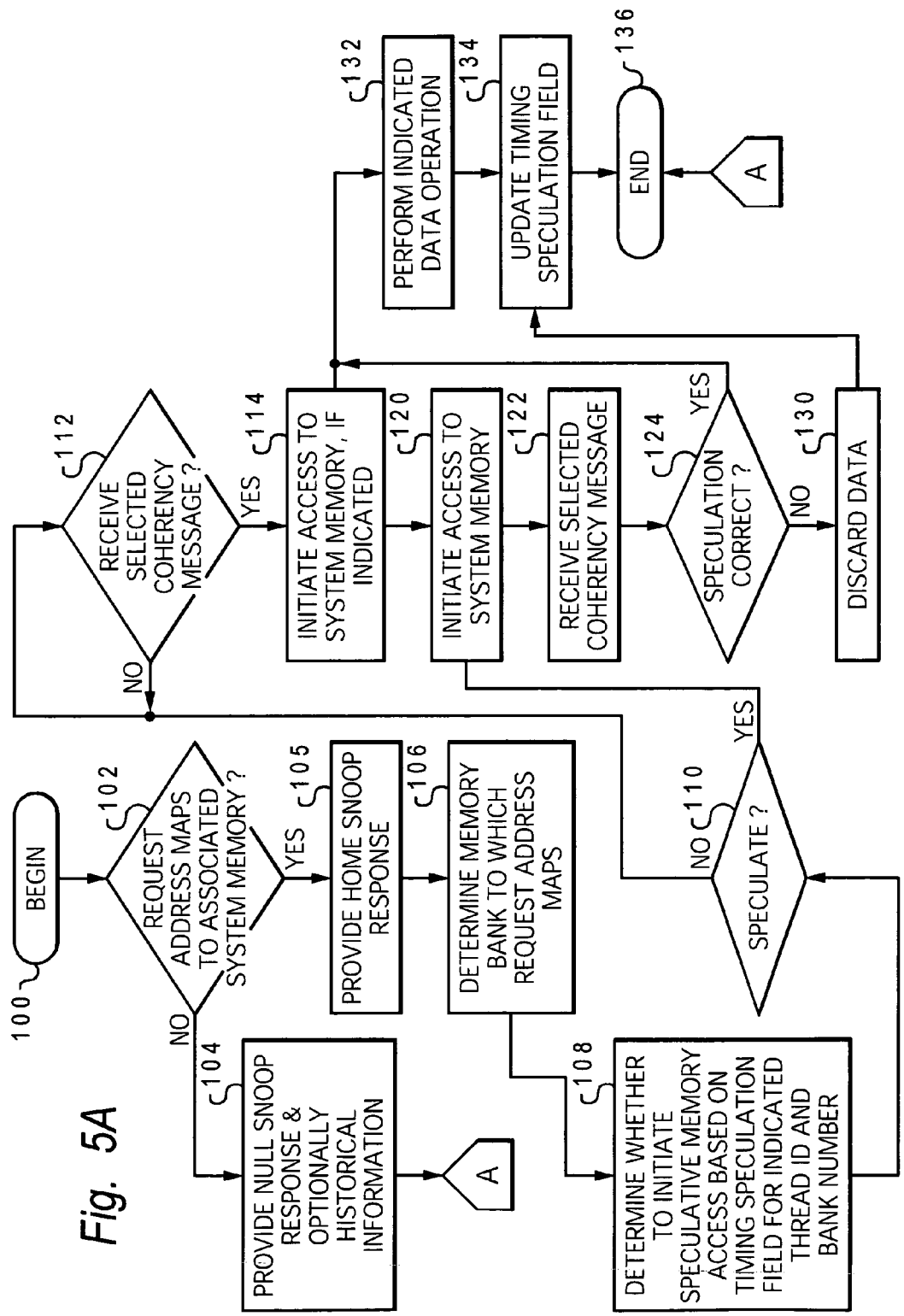
FIG. 5A is high level logical flowchart of a process of memory-based timing speculation in accordance with one embodiment of the present invention.

Referring now to FIG. 5A, there is depicted a high level logical flowchart of an exemplary process by which an IMC 18 processes a request transaction in order to determine whether or not to speculatively initiate a memory access cycle in advance of receipt of a selected coherency message (e.g., snoop response, partial combined response, or combined response). As a logical flowchart, some of the illustrated steps may be performed concurrently or in a different sequence than illustrated.

As illustrated, the process begins at block 100 in response to receipt by IMC 18 of a request transaction (e.g., data read) from either interconnect 12 or an affiliated processor core 14 within its processing unit 10. Although in different implementations IMC 18 may receive request transactions issued by an affiliated processor core 14 at different times with respect to the issuing of the request transaction on interconnect 12, it is assumed herein for simplicity that IMC 18 receives request transactions from affiliated processor cores 14 when the request transaction is issued on interconnect 12 (e.g., following a miss in the local cache hierarchy 16). The request transaction preferably includes a transaction type (e.g., read, read-with-intent-to-modify, flush, kill, etc.), a thread ID of the instruction that generated the request transaction, and a request address.

Figure 8:
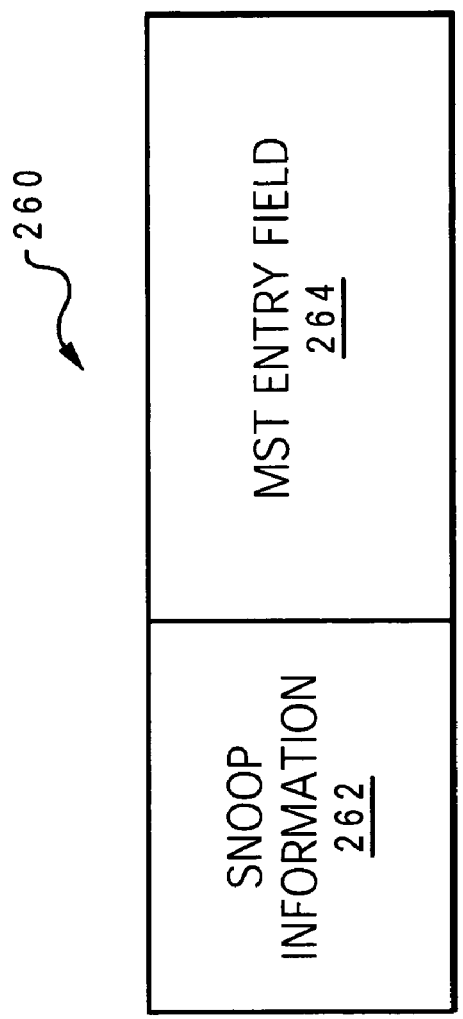
FIG. 8 is a block diagram of an exemplary format of a snoop response in accordance with one embodiment of the present invention.

The process then proceeds from block 100 to block 102, which illustrates IMC 18 determining whether or not the request address specified by the request transaction is assigned to a storage location in the attached system memory 22. This determination may be made, for example, by reference to a memory map and/or by hashing the request address specified by the request transaction. If a determination is made at block 102 that the request address does not map to the attached system memory 22, IMC 18 provides a NULL snoop response indicating that the specified request address does not map to the attached system memory 22, as shown at block 104. As described below with reference to FIGS. 7 and 8, IMC 18 may optionally provide historical information regarding previously snooped requests. Thereafter, the process passes through connector A and terminates at block 136.

If, however, IMC 18 determines at block 102 that the specified memory address maps to the attached system memory 22, IMC 18 provides a HOME snoop response indicating that its attached system memory 22 is the current "home" storage location of the address range containing the specified request address, as illustrated at block 105. As described above, response logic 30 combines this snoop response with the snoop responses provided by cache hierarchies 16 and other IMCs 18 to produce a combined response representing the overall response of data processing system 8 to the request transaction.

As further illustrated at block 106, IMC 18 also determines the memory bank 56 in the attached system memory 22 to which the specified request address maps, for example, by reference to a memory map or by hashing the request address. Utilizing this bank number and the thread ID included within the request transaction, IMC 18 accesses the corresponding timing speculation field 84 within MST 20. As shown at block 108, IMC 18 then applies a selected timing speculation algorithm to the historical information contained within timing speculation field 84 to determine whether or not to initiate a speculative memory access in advance of receipt of the coherency message (e.g., snoop response, partial combined response, or combined response) ordinarily indicating that a memory access should be initiated. The timing speculation algorithm applied by IMC 18 to the contents of timing speculation field 84 may comprise, for example, ANDing the bits within timing speculation field 84 and deciding to speculate if the result is a logical "1" (indicating that the previous 8 request transactions by this thread to this memory bank 56 were serviced by IMC 18 from system memory 22). Alternatively, IMC 18 may decide to initiate a speculative memory access if a selected number (e.g., 6) of the previous 8 accesses were serviced by IMC 18 from system memory 22. The timing speculation algorithm may also take into account other factors, such as IMC 18 may additionally consider other factors, such as past prediction success, enforcement of a desired limit to local or global power dissipation, or information regarding an access type (e.g., prefetch, load-with-reserve, etc.). It will also be appreciated that the timing speculation algorithm applied by IMC 18 at block 108 may be dynamically selectable based upon system performance monitoring or compiler-generated hints.

If IMC 18 determines at block 108 not to initiate a speculative memory access, the process passes from block 108 through block 110 to block 112, which depicts IMC 18 waiting for receipt of a selected coherency message (e.g., partial combined response or combined response) before initiating a memory access, if any. In response to receipt of the coherency message, IMC 18 initiates access to system memory 22 if indicated by the coherency message, as shown at block 114. As discussed above, IMC 18 initiates the memory access by providing address and control signals via memory bus 21 to the relevant RD chip(s) 24, which in turn drives the signals to the appropriate DIMM(s) 26. If the coherency message indicates that IMC 18 is responsible for servicing the request transaction, IMC 18 performs the indicated data operation at block 132, for example, by providing data retrieved from system memory 22 to the requester. In addition, IMC 18 updates MST 20 to indicate whether or not IMC 18 serviced the request transaction by accessing system memory 22. Thereafter, the process terminates at block 136.

Returning to block 108, if IMC 18 determines that speculative access to system memory 22 should be initiated based upon the application of the timing speculation algorithm to the contents of speculative timing field 84, IMC 18 speculatively initiates memory access to system memory 22 (block 120) in the manner discussed above before receiving the coherency message (block 122) indicating whether or not IMC 18 is responsible for servicing the request transaction. If IMC 18 determines at block 124 that the coherency message indicates that IMC 18 is responsible for servicing the request transaction, that is, that the speculation was correct, IMC 18 performs the indicated data operation at a significantly reduced latency and updates MST 20, as indicated at blocks 132 and 134. If, however, the coherency message indicates that the speculation was incorrect, that is, that IMC 18 is not responsible for servicing the request transaction, then IMC 18 discards (and causes system memory 22 to discard) any erroneous data associated with the request transaction, as shown at block 130. Thereafter, IMC 18 updates MST 20 timing speculation field 84 as shown at block 134, and the process terminates at block 136.

Figure 6:
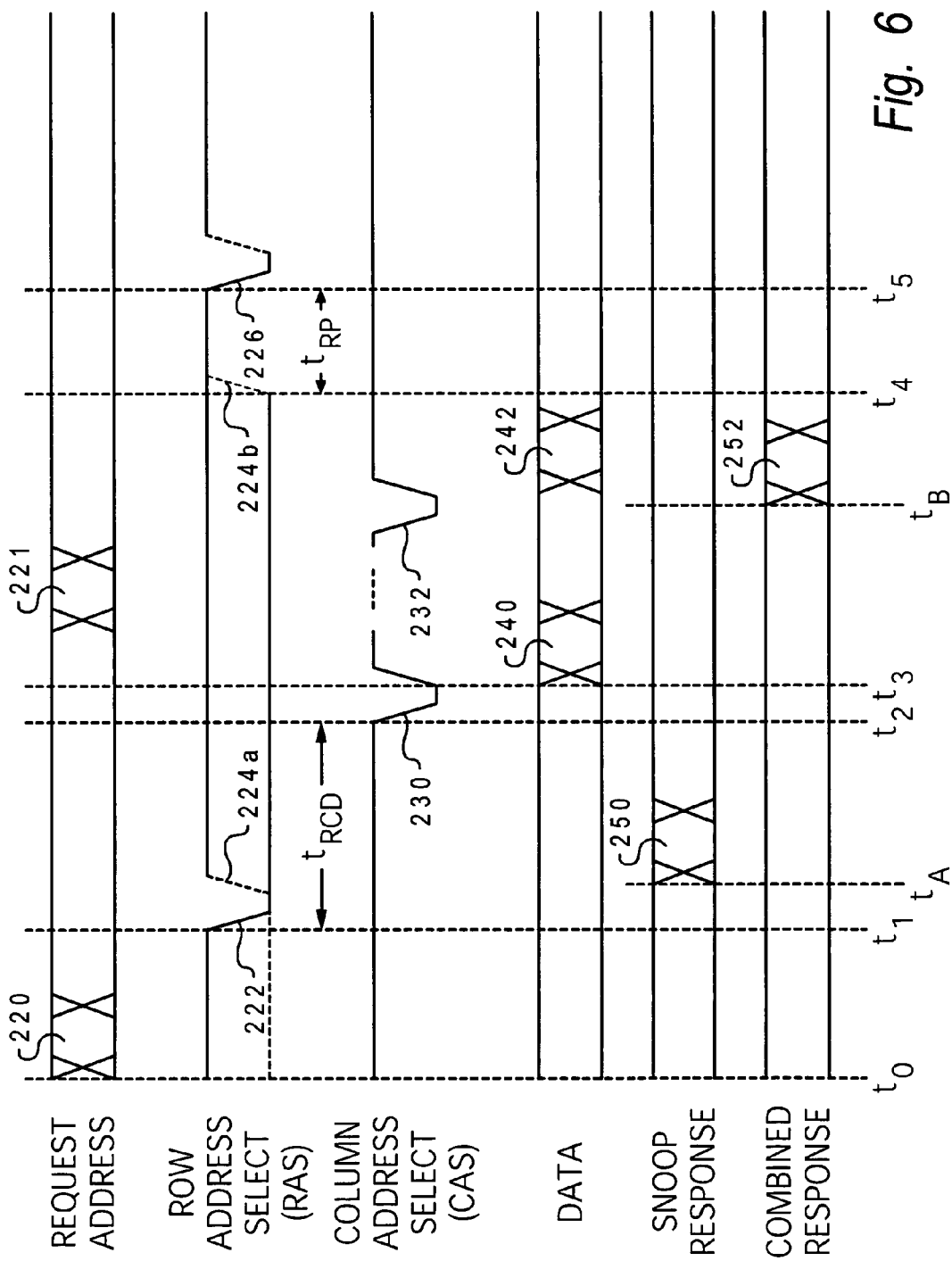
FIG. 6 is a timing diagram illustrating memory-based timing and row speculation in accordance with the present invention.

The latency reduction achieved through memory-based timing speculation in accordance with the process illustrated in FIG. 5A can best be appreciated by reference to the timing diagram of a read transaction provided in FIG. 6. It should be understood that the states of RAS and CAS shown in FIG. 6 represent the internal states of these signals within system memory 22 and do not necessarily represent (and may differ from) the state of signals at the interface between an IMC 18 and the associated system memory 22.

As shown, each IMC 18 receives the request address 220 of a read request transaction at time $t_0$. If an IMC 18 decides to speculatively initiate access to its attached system memory 22, the IMC 18 provides the specified request address 220 (or at least the row portion) to its attached system memory 22 and, if the active-low RAS signal is not already speculatively asserted in accordance with the row-based speculation described below, causes the active-low RAS signal to be asserted at time $t_1$, as indicated at reference numeral 222. IMC 18 subsequently causes the the active-low CAS signal to be asserted at time $t_2$, as indicated at reference numeral 230. Subsequently, system memory 22 provides the desired data 240 to IMC 18 at time $t_3$.

Asynchronously to the speculative access to system memory 22, each snooping agent coupled to interconnect 12 provides a snoop response 250 at time $t_A$, which response logic 30 combines to produce a combined response 252 provided to all agents at time $t_B$. Absent speculation, IMC 18 would initiate access to system memory 22, if necessary, in response to receipt of combined response 252. Thus, successful timing speculation in accordance with the present invention results in a latency reduction of at least the period between times $t_1$ and $t_B$, which at minimum is equal to $t_{RCD}$ plus $t_3-t_2$.

Figure 5B:
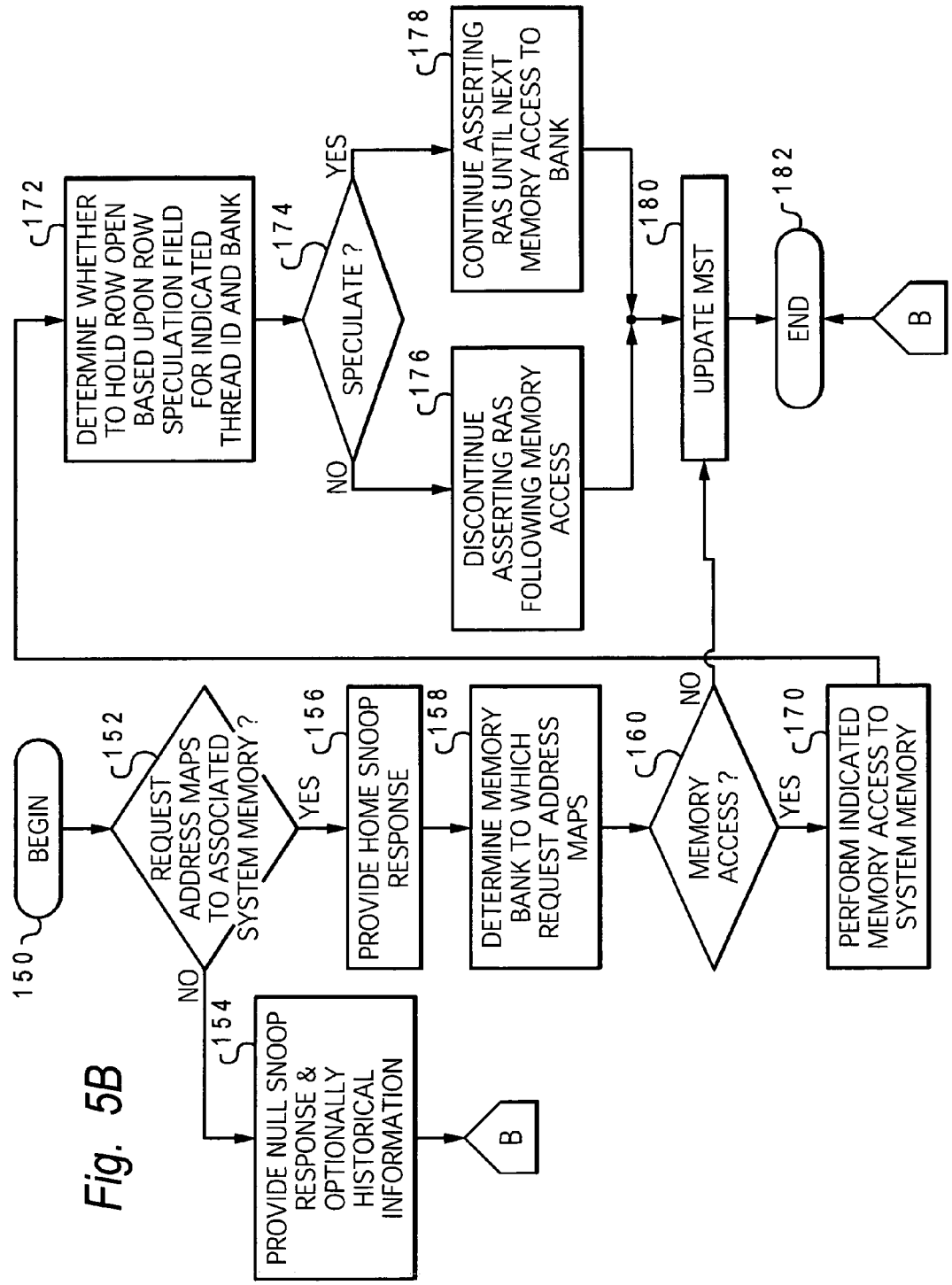
FIG. 5B is a high level logical flowchart of a process of memory-based row speculation in accordance with one embodiment of the present invention.

With reference now to FIG. 5B, there is depicted a high level logical flowchart of an exemplary process by which an IMC 18 reduces the internal component ($t_{INT}$) of memory access latency by selectively employing row speculation by reference to historical information in accordance with one embodiment of the present invention. As illustrated, the process begins at block 150 in response to receipt by IMC 18 of a request transaction from either interconnect 12 or an affiliated processor core 14 within its processing unit 10. As above, the request transaction preferably includes a transaction type (e.g., read, read-with-intent-to-modify, flush, kill, etc.), a thread ID of the instruction that generated the request transaction, and a request address.

The process then proceeds from block 150 to block 152, which illustrates IMC 18 determining whether or not the request address specified by the request transaction is assigned to a storage location in the attached system memory 22. This determination may be made, for example, by reference to a memory map and/or by hashing the request address specified by the request transaction. If a determination is made at block 152 that the request address does not map to the attached system memory 22, IMC 18 provides a NULL snoop response at block 154 indicating that the specified request address does not map to the attached system memory 22. As noted above and as described below with reference to FIGS. 7 and 8, IMC 18 may optionally also provide historical information regarding previously snooped requests. Thereafter, the process passes through connector B and terminates at block 182.

If, however, IMC 18 determines at block 152 that the specified memory address maps to the attached system memory 22, IMC 18 provides a HOME snoop response at block 156 indicating that its attached system memory 22 is the "home" storage location of the data associated with the specified request address. As described above, response logic 30 combines this snoop response with the snoop responses provided by cache hierarchies 16 and other IMCs 18 to produce a combined response representing the overall response of data processing system 8 to the request transaction.

As further illustrated at block 158, IMC 18 determines the memory bank 56 in the attached system memory 22 to which the specified request address maps, for example, by reference to a memory map and/or by hashing the request address. In addition, at block 160, IMC 18 determines whether or not to initiate a memory access to the attached system memory 22 in response to the request transaction. IMC 18 may speculatively make the determination depicted at block 160 by reference to MST 20 as discussed above with reference to FIG. 5A, or may simply make the determination in response to receipt of the request transaction's combined response (or other designated coherency message).

In either case, if a memory access to the attached system memory 22 is not ultimately necessary (e.g., the request transaction is serviced by reference to a lower latency cache hierarchy 16), the process passes from block 160 to block 180. Block 180 illustrates IMC 18 updating the history bits 94 in the relevant row speculation field 86 within MST 20 to indicate that holding the primary row open for this request transaction would not have reduced latency. As noted above, IMC 18 may alternatively or additionally update the row speculation field 86 by replacing the primary and/or secondary rows for which row speculation history is recorded. Thereafter, the process shown in FIG. 5B terminates at block 182.

Returning again to block 160, in response to IMC 18 determining to initiate a memory access, IMC 18 performs the requested read or write access to the attached system memory 22, as shown at block 170. In addition, as illustrated at block 172, IMC 18 determines, by applying a selected row speculation algorithm to the contents of the relevant row speculation field 84, whether or not to hold open the row 52 containing the request address following the access. As noted above, IMC 18 may employ any of a variety of different row speculation algorithms to make the determination shown at block 172. For example, IMC 18 may speculatively leave the row open if a selected number (e.g., 6 of 8) of history bits 94a of the primary row segment 90a are ones ("1") and/or if a consecutive number (e.g., 4) of the most recent history bits 94a are ones ("1"). IMC 18 may alternatively or additionally consider other factors, such as past prediction success, enforcement of a desired limit to local power dissipation (e.g., by capping the total number of rows that can be held open at a time), global power dissipation, or information regarding an access type (e.g., prefetch, load-with-reserve, etc.).

If IMC 18 decides to speculatively hold open a row 52, IMC 18 (and/or RD chip 24) causes the RAS signal to continue to be asserted within the system memory 22 until a subsequent memory access by IMC 18 to the same memory bank 56, as shown at block 178. If, on the other hand, IMC 18 decides not to hold open the row 52, IMC 18 causes assertion of the active-low RAS signal to be discontinued following the access without regard to any subsequent access, as depicted at block 176. In either event, IMC 18 updates the relevant row speculation field 86 within MST 20 to reflect the results of the completed memory access, as indicated at block 180. Thereafter, the process terminates at block 182.

Referring again to the timing diagram given in FIG. 6, the latency reduction achieved through row speculation in accordance with the process shown in FIG. 5B may be seen. As above, IMC 18 initiates access to data 240 stored in a row 52 in response to receipt of request address 220 by causing the active-low RAS signal to be asserted at time $t_1$. IMC 18 thereafter causes the active-low CAS signal to be asserted at time $t_2$, which causes the DIMM 26 to output (or store) the desired data 240 at time $t_3$.

According to the row speculation methodology depicted in FIG. 5B, IMC 18 may "close" the row 52 in a conventional manner and initiate a refresh of the bank 56 by causing RAS to be deasserted, as shown at reference numeral 224a. Alternatively, if indicated by the application of the row speculation algorithm to the relevant row speculation field 86, IMC 18 may speculatively leave the row 52 open by causing RAS to continue to be asserted until after at least one subsequent request address 221 is received, transmitted to the DIMM 26, and latched in response to reassertion of CAS, as shown at reference numeral 232. After the one or more additional memory accesses to the same row 52 (or a misprediction), IMC 18 will close the row and initiate a refresh cycle, as shown at reference numeral 224b. In this manner, the RAS-to-CAS latency ($t_{RCD}$), which can amount to two-thirds or more of the internal memory latency ($t_{INT}$), is advantageously eliminated for subsequent accesses to data 242 for which the row speculation proves to be correct. It will be appreciated, however, that it is important to implement a row speculation algorithm having a high success rate because the penalty for misprediction includes both additional power dissipation and an increase in the access latency for the mispredicted access of at least $t_{RP}$ (i.e., the time between $t_4$ and $t_5$ required to refresh the bank 56).

Those skilled in the art will appreciate that the foregoing row speculation methodology differs greatly from conventional memory accesses, including so-called "burst" accesses. In a conventional burst access, the memory controller, in response to a burst command, sequentially accesses multiple columns of data within the same row of memory while continuing to assert RAS. However, in such cases, the continued assertion of RAS during multiple accesses is not speculative because the multiple accesses are all specified by the burst command. Moreover, because all of the accesses comprising the burst are specified by the burst command, the memory controller does not consult historical information (e.g., such as that recorded in MST 20) to determine whether or not to hold open the row by asserting RAS during the multiple accesses.

Figure 7:
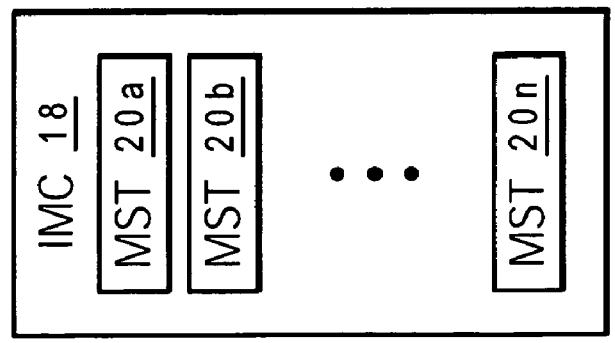
FIG. 7 is a high level block diagram of an alternative embodiment of an integrated memory controller having multiple memory speculation tables in accordance with the present invention.

The memory-based timing speculation and row speculation introduced by the present invention may be further enhanced by the sharing of historical information between IMCs 18. For example, FIG. 7 illustrates an alternative embodiment of an IMC 18 within a processing unit 10 of data processing system 8 of FIG. 1. As shown, in this alternative embodiment, each IMC 18 includes a primary MST 20a for its attached system memory 22, as well as an additional shadow MST 20b–20n for each other IMC 18 within data processing system 8. Each of shadow MSTs 20b–20n stores a weakly synchronized shadow copy of the contents of the MST 20a of the respective associated IMC 18. By sharing the distributed historical information contained in the various primary MSTs 20a among the IMCs 18, timing and row speculation accuracy can be improved.

A number of different techniques can be employed to communicate the historical information contained in the primary MSTs 20a between the various IMCs 18. In one preferred embodiment illustrated in FIG. 8, each snoop response 260 generated by an IMC 18 includes not only conventional snoop information 262, but also an MST entry field 264 containing the contents of an MST entry 82 associated with a particular thread ID and request address specified in the request transaction. Assuming that some or all snoop responses are visible to each IMC 18, the inclusion of a copy of an MST entry 82 from the primary MST 20a in the snoop response of each IMC 18 enables other IMCs 18 to update their shadow MSTs 20 appropriately.

The accuracy of timing and row speculation by IMCs 18 may be further enhanced by designing cache hierarchies 16 to provide additional historical information to IMCs 18. If the memory system of data processing system 8 and the software executed by processor cores 14 are well designed, a high percentage of data access operations requested by processor cores 14 will be serviced by cache hierarchies 16, effectively "shielding" IMCs 18 from any knowledge of the requests. Thus, absent cache hierarchies 16 providing historical data access information to IMCs 18, IMCs 18 will perform timing and/or row speculation based upon historical information representing only a small percentage of the total number of data access operations.

Accordingly, in one embodiment, the cache controllers of cache hierarchies 16 collect and pass to IMCs 18 at least per-thread historical bank access information gathered from data access requests serviced by reference to cache hierarchies 16. The historical bank access information can be communicated to IMCs 18 in conjunction with a request transaction or through asynchronous special-purpose messages. Such historical bank access information can then be referenced by IMCs 18 when determining whether or not to speculatively hold a row open.

Figure 9:
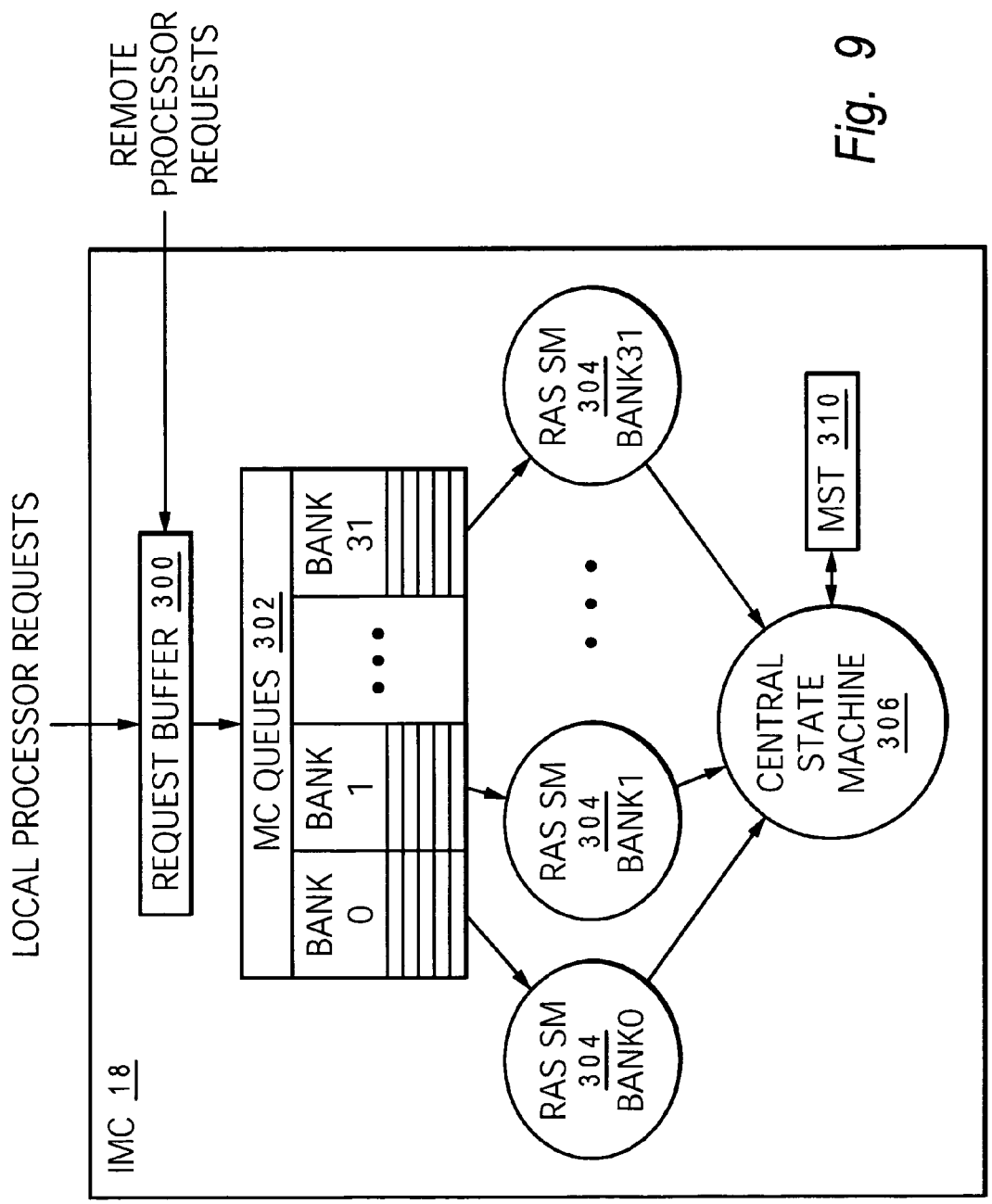
FIG. 9 is a more detailed block diagram of one embodiment of an integrated memory controller (IMC) in accordance with one embodiment of the present invention.

With reference now to FIG. 9, there is illustrated a more detailed block diagram of one embodiment of an IMC 18 in accordance with one embodiment of the present invention. As shown, IMC 18 receives various memory access requests from local processor cores 14 and processor cores 14 within other processing units 10 at a request buffer 300. Request buffer 300 holds each such request until the request is discarded or assigned one of memory controller (MC) queues 302 under the direction of central state machine 306.

As discussed further below, MC queues 302 are a limited resource from which a selected number of queues may be allocated to each bank of system memory 22 in order to service a memory access request. That is, once a memory access request is transferred from request buffer 300 to MC queues 302 by central state machine 306, central state machine 306 will (absent an intervening message) direct an access to system memory 22 in accordance with the memory access request and historical access information provided by RAS state machines (SM) 304 and memory speculation table (MST) 310. Because MC queues 302 are a scarce resource, central state machine 306 preferably only allocates a queue 302 to a memory access request within request buffer 300 if there is a high probability that central state machine 306 will need to initiate an access to system memory 22 based upon the memory access request.

Figure 10:
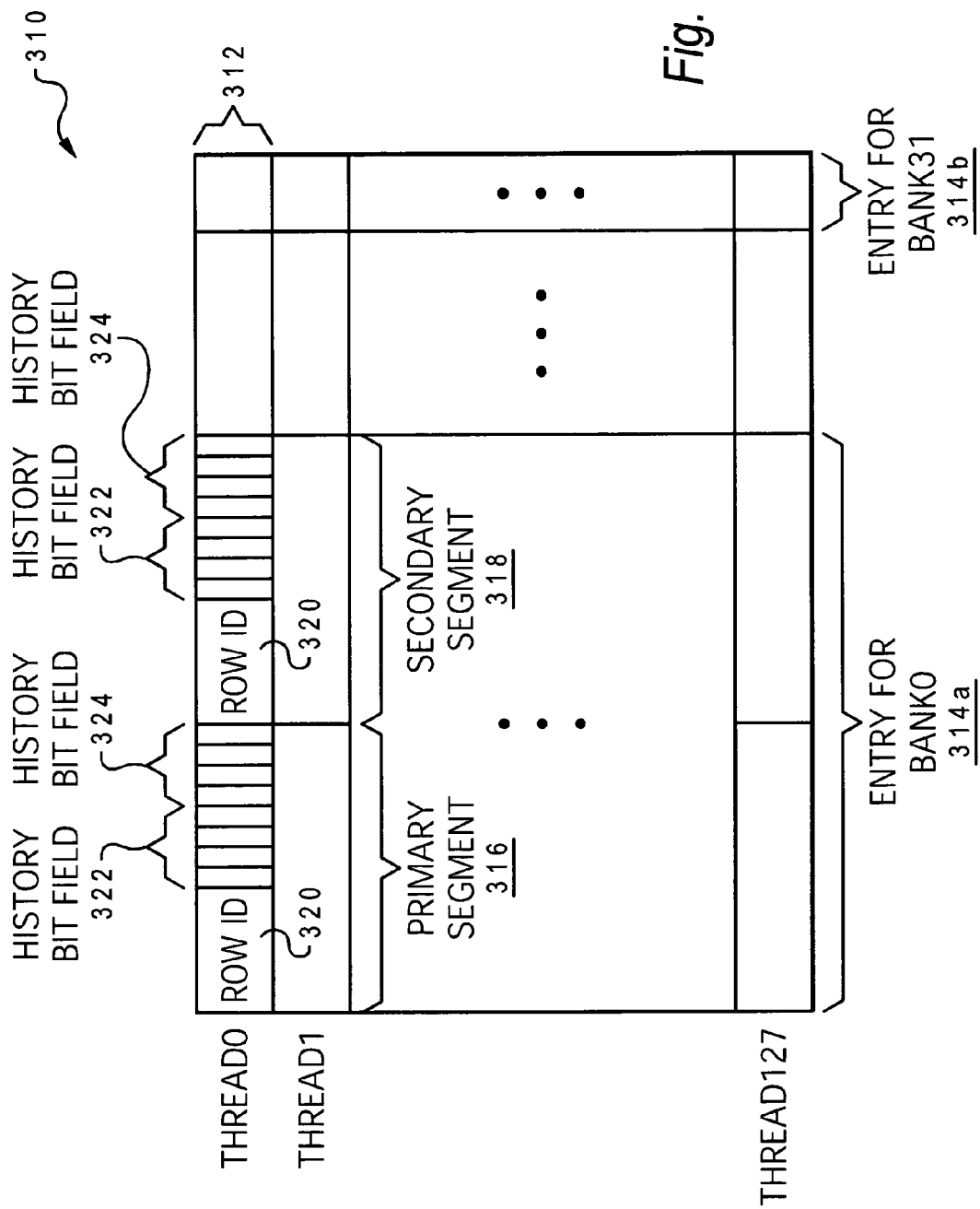
FIG. 10 depicts a more detailed block diagram of the memory speculation table (MST) of FIG. 9.

Referring now to FIG. 10, there is depicted a more detailed block diagram of MST 310 of FIG. 9. As illustrated, MST 310 includes a number of rows 312, which are each associated with a respective one of the 128 concurrent threads supported by the associated processor cores 14. Each row 312 contains an entry 314 (e.g., 314a, 314b) for each of the 32 banks within the associated system memory 22.

As further illustrated in FIG. 10, all entries 314 for a particular bank of system memory 22 essentially form a 128-entry cache containing two segments 316, 318 for each thread. The primary segment 316 and secondary segment 318 within each entry 314 are identically organized, with a row ID field 320 and two history bit fields 322 and 324.

History bit field 322 is preferably implemented as a multiple bit (e.g., four-bit) history field in which each bit represents a respective one of the immediately previous request transactions received by IMC 18 that had a real address mapping to the associated bank and row ID indicated within row ID field 320. A first bit state (e.g., "1") indicates that the corresponding memory access request was serviced by accessing the relevant one of DIMMs 26, and a second bit state (e.g., "0") indicates that the memory access request was serviced without accessing the relevant DIMM 26 of system memory 22 (e.g., by obtaining the requested data from a cache memory 16).

The bits within history bit field 324 conversely indicate whether or not the immediately previous request transactions mapping to the associated bank and the row identified by row ID field 320 were serviced without access to system memory 22. Thus, a first bit state (e.g., "1") indicates that the associated memory access request was serviced without access to system memory 22, and a second bit state (e.g., "0") indicates that the memory access request was serviced by access to system memory 22. Thus, if history bit field 322 contains all 1's, history bit field 324 will contain all 0's, and if history bit field 324 contains all 1's, history bit field 322 will contain all 0's. As discussed above, with respect to FIG. 3, central state machine 306 of IMC 18 utilizes the historical information within history bit fields 322 and 324 to determine whether or not it is likely that a subsequent access to a particular memory bank by a particular thread will be serviced by accessing system memory 22. Based upon this determination IMC 18 can selectively and intelligently initiate speculative memory access cycles in advance of certain coherency response messages (e.g., snoop response, partial combined response or combined response) in order to reduce the communication latency ($t_{com}$) component of access latency.

As can be seen by comparison of FIG. 10 with FIG. 3, MST 310 differs from MST 20 of FIG. 3 in that MST 310 does not store historical information utilized in memory-based row speculation. In accordance with the embodiment of IMC 18 depicted in FIG. 9, the historical information utilized to control memory-based row speculation is instead maintained individually for each bank of system memory 22 within a respective RAS state machine 304.

Figure 11:
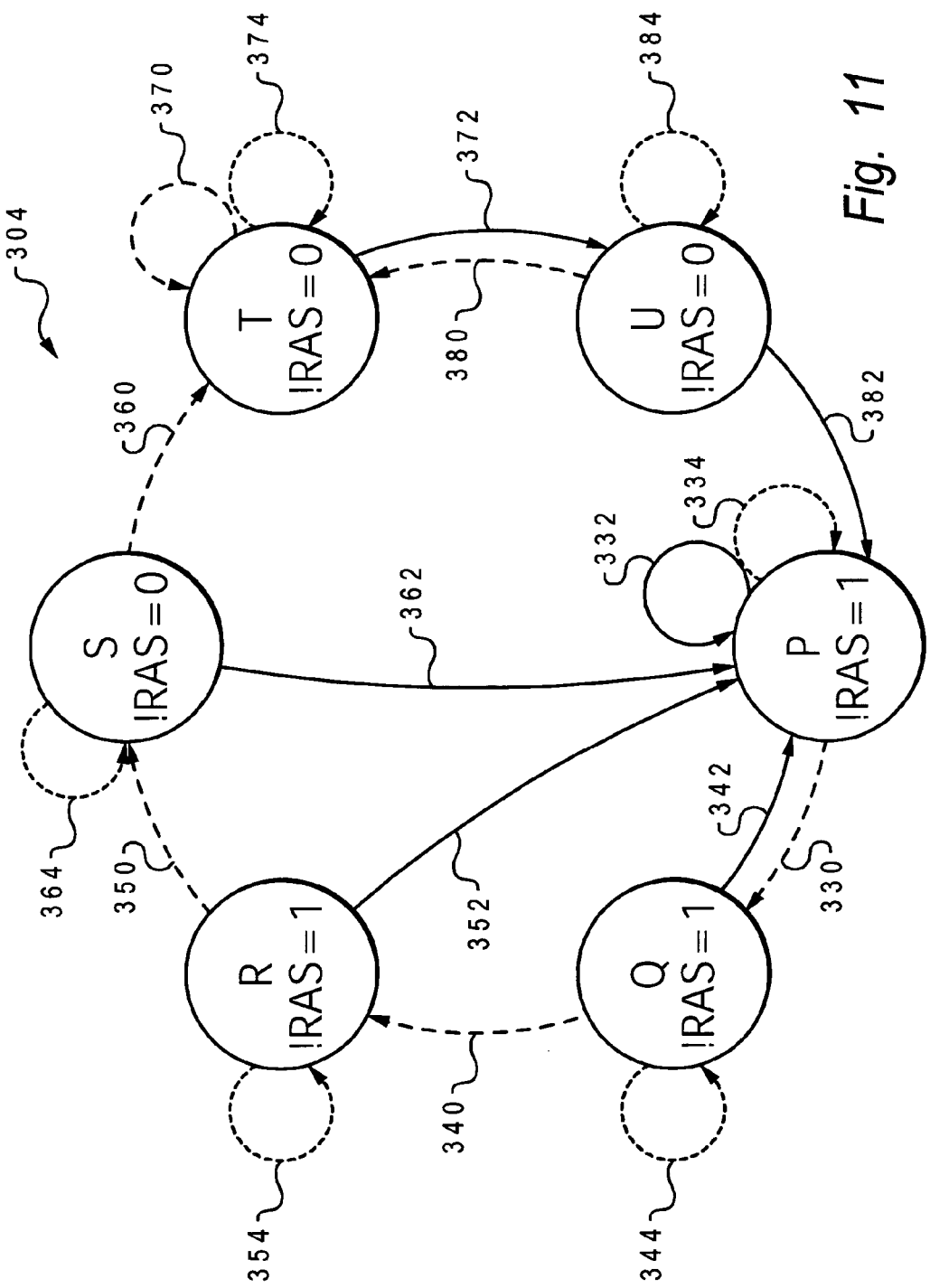
FIG. 11 depicts a state diagram of an exemplary Row Address Strobe (RAS) state machine in accordance with one embodiment of the present invention.

With reference now to FIG. 11, there is depicted a state diagram of an exemplary RAS state machine 304 in accordance with one embodiment of the present invention. The depicted embodiment includes six states P–U, which each have an associated RAS state. For example, in state P, there is no memory-based row speculation in the associated memory bank 56, and the default state for the active-low RAS signal is a high logical state (e.g., "1"). Conversely, when RAS state machine 304 is in state Q, central state machine 306 employs memory-based row speculation for the associated bank 56 of system memory 22 by speculatively holding the active-low RAS signal in a low logical state (e.g., "0") for a selected row address.

RAS state machine 304 receives as inputs those memory access requests selected by central state machine 306 from MC queues 302, for example, based upon priority order. As indicated in FIG. 11 by differing line styles, RAS state machine 304 evaluates its current state bases upon three types of inputs:

(1) A memory access request that specifies an address matching one of the row IDs specified in row ID field 320 of an entry in the associated bank 314 and that was serviced by access to the associated system memory 22;

(2) A memory access request specifying an address that matches one of the row IDs indicated in one of the row ID fields 320 in the entry 314 for the associated memory bank, but that is not serviced by access to the associated system memory 22; and (3) A memory access request that is marked as a pre-fetch request or one that specifies a request address that does not match any of the IDs cached in the relevant set of entries for the associated bank.

These three classes of memory access requests are respectively represented in FIG. 11 by a heavy dashed line, a solid line, and a light dashed line.

In operation, RAS state machine 304 is initialized to state P in which the active-low RAS signal has a default state of logic high, meaning that no memory-based row speculation is performed for the associated memory bank 56. That is, unless a history of memory access operations has been compiled that suggests significant latency reduction can be achieved by speculatively holding open a particular row within the memory bank 56, no memory-based row speculation is performed so that power consumption is reduced. As indicated by arrows 330, 340, 350 and 360, in response to receipt of an unbroken sequence of memory access requests all specifying a particular row address and which are all serviced by access to system memory 22, state machine 304 transitions through states Q, R and S to state T, in which memory-based row speculation is performed. Thus, if four sequential memory access requests to a same row of a memory bank are received, the associated RAS state machine 304 indicates by state T that the active-low RAS signal should be maintained by central state machine 306 in a logical low state for a subsequent access to the same memory row because of the statistical likelihood that system memory 22 will service such a request.

As indicated by arrows 332, 342, 352 and 362, if at any time during the transition from state P to state T, a memory request mapping to the same row address that is a potential target of row speculation is serviced without access to system memory 22, RAS state machine 304 will return to state P. FIG. 11 further illustrates by arrows 334, 344, 354, 364, 374 and 384, that RAS state machine 304 will not change state in response to receipt of a pre-fetch memory access request from the associated processor cores 14 or in response to receipt of a memory access request of which the specified memory address misses within the row ID fields 320 of MST 310 corresponding to the associated memory bank 56.

If memory-based row speculation is established for a particular row address, as is represented by RAS state machine 304 entering state T, RAS state machine 304 will remain in state T as long as each subsequent memory access request is a pre-fetch request, indicates a row address that misses MST 310, or indicates a row address that hits in MST 310 and is serviced by reference to system memory 22. RAS state machine 304 will transition from state T to state U, as represented by arrow 372, if RAS state machine 304 receives a memory access request that specifies a row address that hits in MST 310 and that is not serviced by reference to system memory 22. If RAS state machine 304 is in state U, central state machine 306 still performs memory-based row speculation for the selected row address by holding the active-low RAS signal in a logic-low state. From state U, RAS state machine 304 can return to state T if a subsequent memory access request hits in MST 310 and is serviced by reference to system memory 22 (arrow 380). If, however, RAS state machine 304 is in state U and receives a memory access request specifying a row address that hits in MST 310 and that is not serviced by reference to system memory 22, RAS state machine 304 transitions from state U to state P, as indicated by arrow 382.

In summary, FIG. 11 depicts an exemplary RAS state machine 304 that permits central state machine 306 to intelligently perform memory-based row speculation if historical access patterns within a particular bank of system memory 22 indicate that there is a high probability that a subsequent access will fall within a previously accessed row. In this manner, the power dissipation incurred by holding a row or rows within a bank of system memory 22 open between memory accesses has a high probability of significantly reducing memory access latency for those memory accesses for which speculation is performed.

Figure 12A:
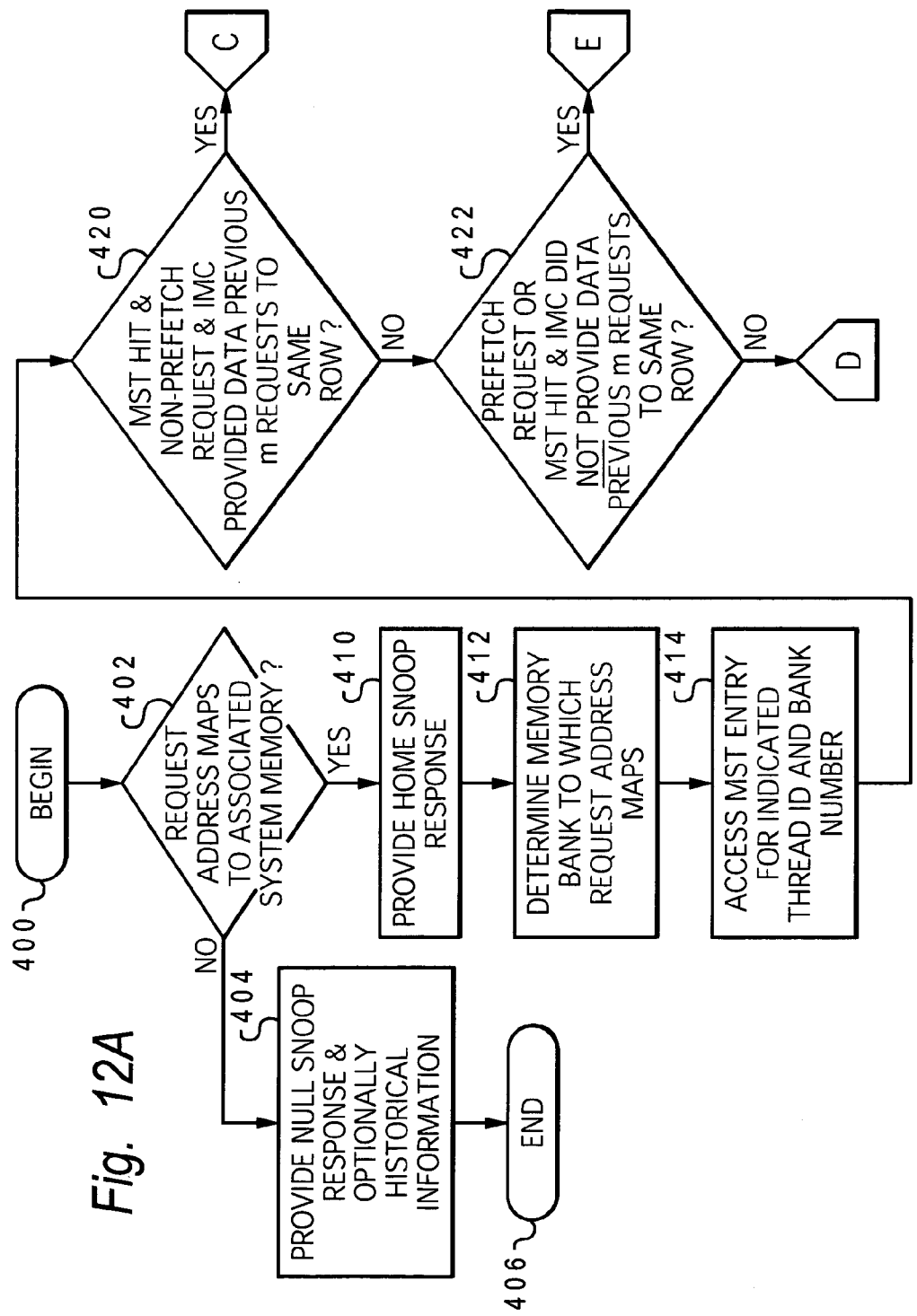
FIG. 12A–12D together form a high level logical flowchart of a process by which a central state machine employs both memory-based timing and row speculation in combination to optimize memory access latency to an associated system memory.

With reference now to FIGS. 12A–12D, there is illustrated a high level logical flow chart of a process by which central state machine 306 of IMC 18 of FIG. 9 employs both memory-based timing and row speculation in combination to optimize memory access latency to the associated system memory 22. Referring first to FIG. 12A, the process begins at block 400 in response to receipt by IMC 18 of a memory access request transaction (e.g., data read) from either interconnect 12 or an affiliated processor core 14 within its processing unit 10. As discussed above, the request transaction preferably includes the transaction type, a thread ID of the instruction (e.g., LOAD or STORE) that generated the request transaction, and a request address. Hereafter, it is assumed that the transaction type is a READ.

The process then proceeds from block 400 to block 402, which depicts IMC 18 determining whether or not the request address specified by the request transaction is assigned to a storage location in the attached system memory 22. If a determination is made at block 402 that the request address does not map to the attached system memory 22, IMC 18 provides a NULL snoop response at block 404, indicating that the specified request address does not map to the attached system memory 22. In addition, as discussed above with reference to FIGS. 7–8, IMC 18 may provide historical information pertaining to previously snooped memory access requests. Thereafter, the process terminates at block 406. If, however, IMC 18 determines at block 402 that the specified memory address maps to the attached system memory 22, IMC 18 provides a HOME snoop response indicating that its attached system memory 22 is the "home" storage location of the data associated with the specified request address, as depicted at block 410. As discussed above, the snoop response is combined with other snoop responses by response logic 30 to generate a combined response representing the overall responsive data processing system 8 to the request transaction.

As shown at block 412, IMC 18 also determines the memory bank 56 in the attached system memory 22 to which the specified request address maps. Utilizing this bank number and the thread ID included within the request transaction, IMC 18 accesses the corresponding entry within MST 310. Based upon the information within MST 310, IMC 18 services the memory access request in one of three ways represented by FIGS. 12B, 12C and 12D, respectively.

Figure 12B:
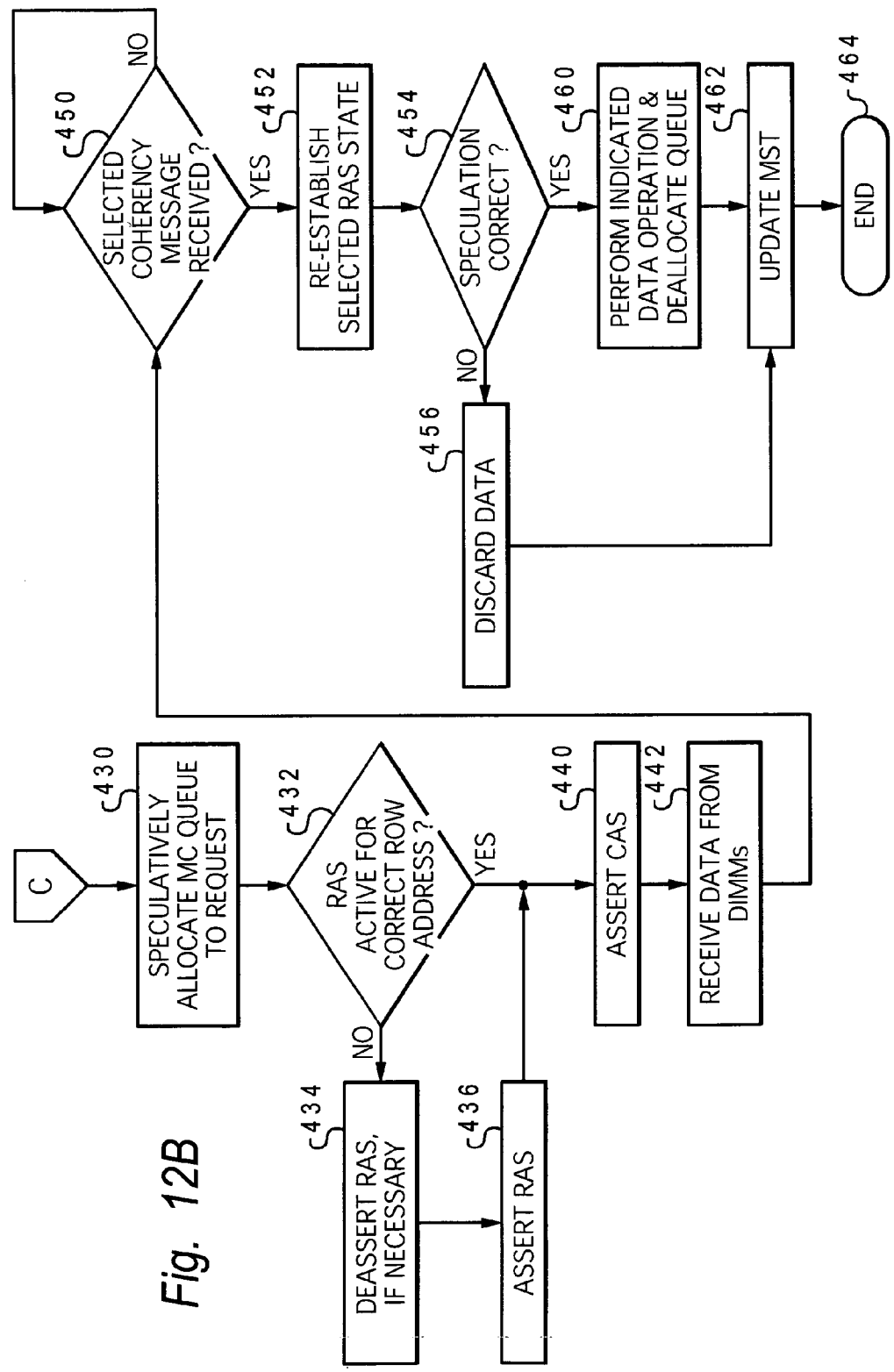

For example, as illustrated at block 420, if IMC 18 determines by reference to MST 310 and the memory access request that (1) the memory access request is not a pre-fetch request, (2) the request address hit in MST 310 and (3) IMC 18 serviced each of the previous n (i.e., in this case four) requests to this row address, IMC 18 services the memory access request utilizing timing speculation, and, if possible, row speculation in accordance with the process illustrated in FIG. 12B. If, on the other hand, IMC 18 determines that (1) the memory access request is a pre-fetch request, or (2) that the request address hit in MST 310 and the relevant history bit field 324 is set to all 1's indicating that IMC 18 did not service the previous n (i.e., four) requests to this row, IMC 18 services the memory access request without timing or row speculation in accordance with the process illustrated in FIG. 12D. Other memory access requests, that is, those resulting in an MST miss or those for which neither of history bit fields 322 and 324 is set to all 1's, are serviced without row or timing speculation in accordance with the process depicted in FIG. 12C. Thus, IMC 18 selectively and intelligently services memory access requests utilizing timing and row speculation in order to decrease access latency for selected memory access requests for which historical access patterns indicate that the concomitant use of resources will prove justified.

Referring now to FIG. 12B, the process continues after page connector C at block 430. Block 430 depicts central state machine 306 allocating an MC queue 302 to the memory access request. That is, central state machine 306, based upon its examination of MST 310 speculatively allocates an MC queue 302 to the memory access request in advance of receipt of a coherency response, such as a partial combined response or complete combined response, indicating that IMC 18 is responsible for servicing the memory access request.

Central state machine 306 next determines at block 432 whether or not the active-low RAS signal is currently active for the correct row address. In other words, central state machine 306 determines whether or not row speculation for the correct row is currently being performed by holding the correct row open. If not, central state machine 306 causes the RAS signal, if any, currently being asserted in the relevant bank of system memory 22 to be de-asserted as shown at block 434, and causes the active-low RAS signal to be asserted for the correct row, as illustrated at block 436. If, however, central state machine 306 determines that row speculation is currently being performed for the correct row, the internal latency attributable to blocks 434 and 436 ($t_{RP}+t_{RCD}$) can be eliminated. In this case, central state machine 306 can simply cause the active-low CAS signal to be asserted as shown at block 440 without incurring either the precharge latency ($t_{RP}$) or RAS-to-CAS latency ($t_{RCD}$).

In response to assertion of the RAS signal and CAS signal, central state machine 306 receives the requested data from the relevant one of DIMMs 26, as depicted at block 442. As shown at block 450, IMC 18 buffers the received data until the selected coherency message, for example, a partial combined response or complete combined response is received.

Following receipt of the coherency response message, central state machine 306 re-establishes the selected RAS state for the row currently being monitored for row speculation, as illustrated at block 452. Central state machine 306 also determines at block 454 whether or not the selected coherency message indicates that the speculative access employed to obtain the requested data from system memory 22 was correct. If not, central state machine 306 causes IMC 18 to discard the data retrieved from system memory 22. If, however, the speculation was correct, meaning that the selected coherency message indicated IMC 18 as the source of the requested data, IMC 18 supplies the requested data to the requestor as shown at block 460. Following either of blocks 456 or 460, central state machine 306 updates history bit fields 322 and 324 of the relevant entry within MST 310. Thereafter, the process terminates at block 464.

Figure 12C:
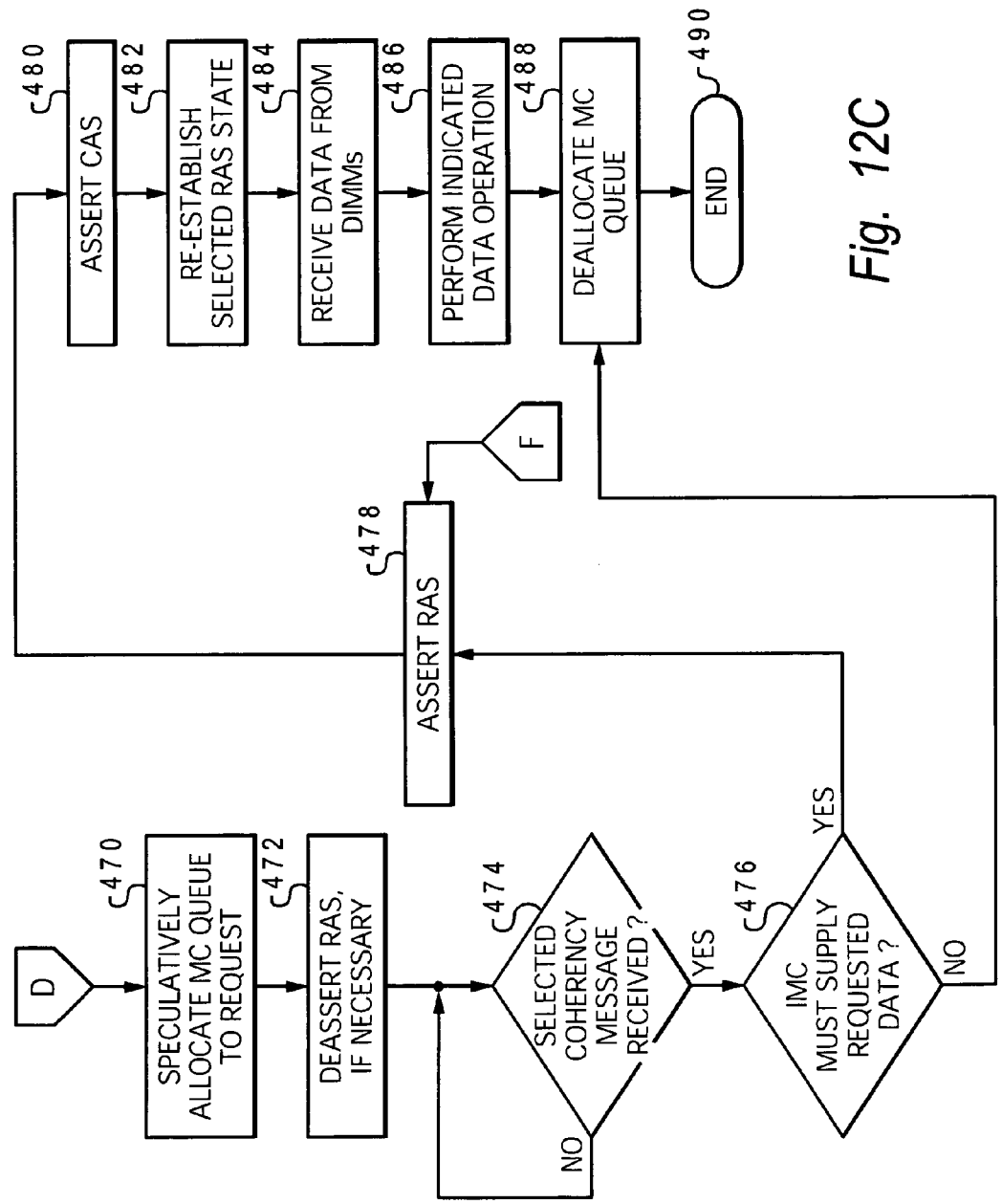

With reference now to FIG. 12C, an exemplary process is depicted by which IMC 18 services memory access requests that result in an MST miss or for which neither of history bit fields 322, 324 within the relevant entry of MST 310 are all 1's. As shown, the process continues from page connector D to block 470, which illustrates central state machine 306 speculatively allocating a MC queue 302 to the memory access request. In addition, as shown at block 472, central state machine 306 causes the active-low RAS signal to be de-asserted, if necessary, to initiate the precharge cycle. By de-asserting the RAS signal in advance of receipt of the selected coherency message (e.g., combined response), central state machine 306 masks the precharge latency ($t_{RP}$) associated with servicing the memory access request. Central state machine 306 then awaits receipt of the selected coherency message (e.g., partial combined response or complete combined response) as indicated at block 474.

If the selected coherency message indicates that IMC 18 is not responsible for supplying the requested data, the process proceeds from block 476 to block 488, which illustrates central state machine de-allocating the MC queue 302 speculatively allocated to the memory access request. In this case, other memory access requests held within request buffer 300 may incur additional access latency due to the speculative allocation of a MC queue 302 to a memory access request that ultimately was not serviced by IMC 18. Following block 488, the process shown in FIG. 12C terminates at block 490.

Returning to block 476, if the selected coherency message received at block 474 indicates that IMC 18 must supply the requested data, the process proceeds from block 476 to block 478, which illustrates central state machine 306 causing the active-low RAS signal to be asserted for the row specified by the request address. Next, following a delay of $t_{RCD}$, central state machine 306 causes the active-low CAS signal to be asserted as depicted at block 480. Next, as illustrated at block 482, central state machine 306 re-establishes the selected RAS state for the row selected as a candidate for row speculation.

When central state machine 306 receives the requested data from one of DIMMs 26 as illustrated at block 484, central state machine 306 supplies the requested data to the requestor, as shown at block 486. Thereafter, central state machine 306 de-allocates the MC queue 302 assigned to the memory access request at block 488 and terminates processing of the memory request at block 490. FIG. 12C thus depicts an embodiment of IMC 18 in which central state machine 306 speculatively allocates MC queues 302 to memory access requests for which either no historical information is available or for which the available historical information is indeterminate. However, for such memory access requests, the depicted embodiment of central state machine 306 does not perform timing or row speculation in order to conserve power and avoid the additional latency incurred by mispeculation.

Figure 12D:
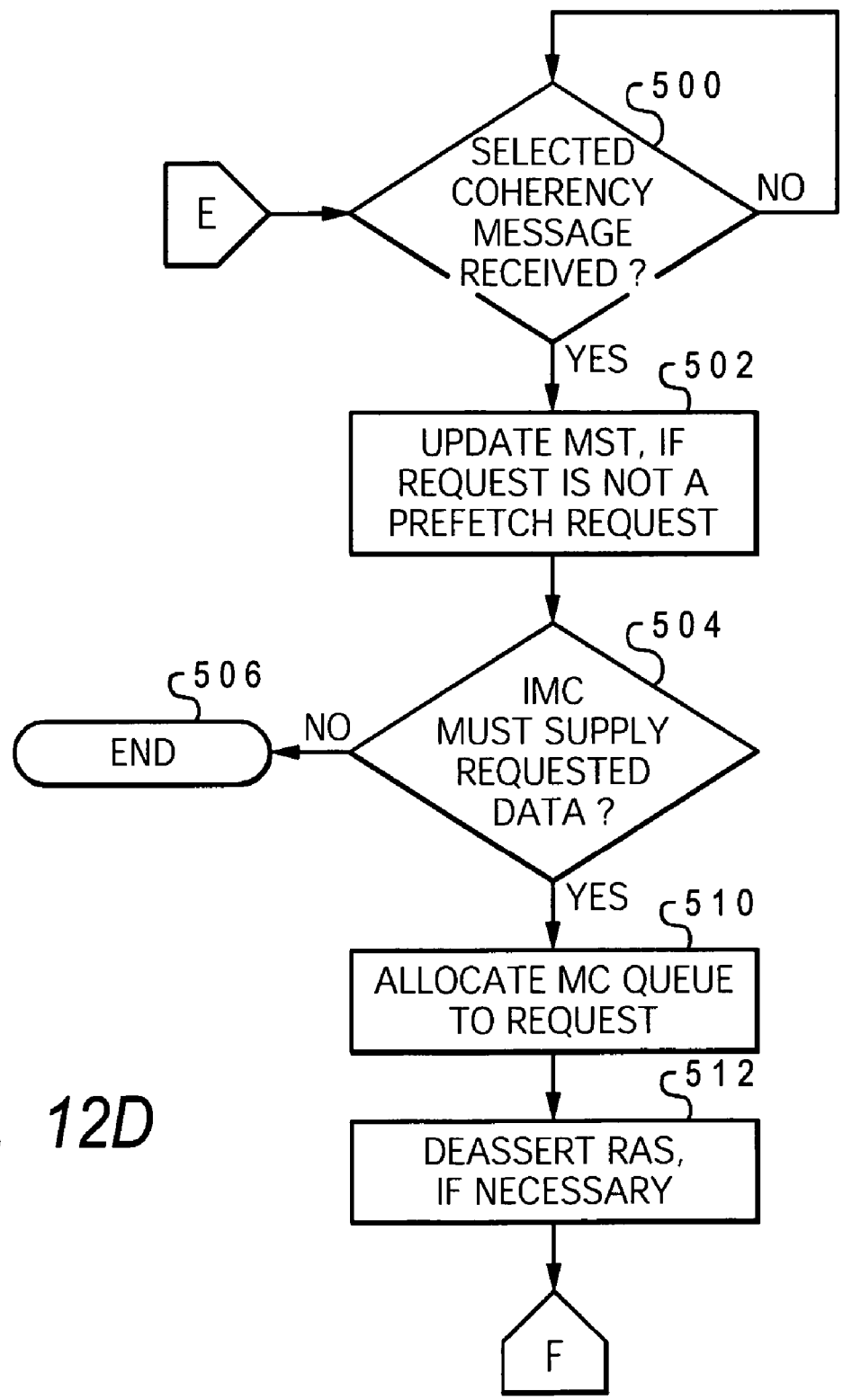

With reference now to FIG. 12D, a process is illustrated by which an exemplary embodiment of IMC 18 services memory access requests which are pre-fetch requests or which historical information indicates have a low probability of being serviced by IMC 18. As illustrated, the process continues from FIG. 12A through page connector E to block 500. Block 500 depicts central state machine 306 awaiting receipt of a selected coherency message (e.g., partial combined response or complete combined response) before taking any action to service the memory access request. Thus, the memory access request remains buffered within request buffer 300 until central state machine 306 determines from the selected coherency message whether IMC 18 is responsible for servicing the memory access request.

In response to receipt of the selected coherency message, central state machine 306 updates history bit fields 322 and 324 within the appropriate entry 314 of MST 310 if the memory access request is not a pre-fetch request. That is, it is preferred that central state machine 306 not "pollute" MST 310 with information pertaining to pre-fetch requests since such requests are highly speculative and may exhibit a low locality of reference.

As depicted at block 504, central state machine 306 also determines whether or not the selected coherency message received at block 500 indicates that IMC 18 must service the memory request. If not, the process simply terminates at block 506. If, however, the selected coherency message indicates that IMC 18 must supply the requested data, the process proceeds to block 510, which illustrates central state machine 306 allocating an MC queue 302 to the memory access request. Central state machine 306 does not allocate an MC queue 302 to the memory access request in advance of receipt of the selected coherency message because of the low statistical probability that IMC 18 will ultimately have to service the memory access request. In this manner, the limited resource represented by MC queues 302 are available to other memory access requests that are more likely to be serviced by IMC 18.

The process shown in FIG. 12D proceeds from block 510 to block 512, which illustrates central state machine 306 causing the active-low RAS signal to be deasserted, if necessary, to precharge the memory row specified by the request address. From block 512, the process passes through page connector F to block 478 of FIG. 12C and following blocks, which have been described above.

As has been described, the present invention provides an improved method and system of memory access in which memory access latency can be advantageously reduced through selective memory-based timing and/or row speculation. By reducing one or both of the communication latency ($t_{COM}$) and internal latency ($t_{INT}$) components of a memory access, average memory access times are reduced, and system performance is improved.

While the invention has been particularly shown as described with reference to a preferred embodiment, it will be understood by those skilled in the art that various changes in form and detail may be made therein without departing from the spirit and scope of the invention. For example, although the present invention has been described with reference to a particular embodiment in which DRAM is employed, the present invention is equally applicable to other memory technologies such as NVRAM, EDRAM, etc.

What is claimed is:

1. A data processing system, comprising:
   one or more processing cores;
   a first memory controller, coupled to said one or more processing cores, that controls access to a first system memory containing a plurality of rows, said memory controller having an access history mechanism that maintains historical information regarding prior memory accesses, wherein said memory controller, responsive to a memory access request directs an access to a selected row among the plurality of rows in the system memory to service the memory access request and speculatively causes the system memory to continue to energize a Row Address Strobe for said selected row following said access based upon said historical intimation indicated by said access history mechanism;
   a second memory controller that controls access to a second system memory; and
   wherein said first memory controller speculatively continues to energize said Row Address Strobe for said selected row based upon historical information recorded by said second memory controller.

2. The data processing system of claim 1, wherein said memory controller and said one or more processing cores are integrated within a same integrated circuit chip.

3. The data processing system of claim 1, wherein said access history mechanism maintains a respective memory access history for each of a plurality of threads executing within said one or more processing cores.

4. The data processing system of claim 1, wherein said plurality of rows in said system memory are arranged in a plurality of banks, and wherein said access history mechanism stores said historical information on a per-bank basis.

5. The data processing system of claim 1, wherein said plurality of rows are organized in one or more banks, and wherein said memory controller speculatively continues to energize said Row Address Strobe for said selected row until a next access to another row within a same bank as said selected row.

6. The data processing system of claim 1, wherein said access history mechanism comprises one or more state machines each having a plurality of different states, wherein each of said plurality of different states represents a prediction regarding whether the system memory should continue to energize a Row Address Strobe of said selected row of said system memory following an access.

7. A data processing system, comprising:
   one or more processing cores;
   a memory controller, coupled to said one or more processing cores, that controls access to a system memory containing a plurality of rows organized in one or more banks, said memory controller having an access history mechanism that maintains historical information regarding prior memory accesses, wherein said memory controller, responsive to a memory access request, directs an access to a selected row among the plurality of rows in the system memory to service the memory access request and speculatively causes the system memory to continue to energize a Row Address Strobe for said selected row following said access based upon said historical information indicated by said access history mechanism; and
   one or more cache hierarchies coupled to said plurality of processing cores and to said memory controller, wherein said one or more cache hierarchies cache data retrieved from said system memory and communicate historical bank access information to said memory controller, said historical bank access information communicated to said memory controller including historical bank access information of memory access requests serviced by said one or more cache hierarchies rather than said memory controller.

8. A memory controller for controlling a system memory of a data processing system including another memory controller, wherein the system memory includes a plurality of rows, said memory controller comprising:
   an access history mechanism tat maintains historical information regarding prior memory accesses; and
   a state machine that, responsive to a memory access request, directs an access to a selected row among the plurality of rows in the system memory to service the memory access request and speculatively causes the system memory to continue to energize a Row Address Strobe for said selected row following said access based upon said historical information indicated by said access history mechanism, wherein said memory controller speculatively continues to energize said Row Address Strobe for said selected row based upon historical information recorded by said another memory controller.

9. The memory controller of claim 8, wherein said access history mechanism maintains a respective memory access history for each of a plurality of threads executing within said data processing system.

10. The memory controller of claim 8, wherein said plurality of rows in said system memory are arranged in a plurality of banks, and wherein said access history mechanism stores said historical information on a per-bank basis.

11. The memory controller of claim 8, wherein said plurality of rows are organized in one or more banks, and wherein said state machine causes said system memory to speculatively continue to energize said Row Address Strobe for said selected row until a next access to another row within a same bank as said selected row.

12. The memory controller of claim 8, wherein said access history mechanism comprises one or more state machines each having a plurality of different states, wherein each of said plurality of different states represents a prediction regarding whether the system memory should continue to energize a Row Address Strobe of said selected row of said system memory following an access.

13. A method of operating a memory controller of a system memory of a data processing system, wherein the system memory contains a plurality of rows, said method comprising:
   said memory controller maintaining historical information regarding prior memory accesses with an access history mechanism;
   in response to receipt of a memory access request directing an access to a selected row among the plurality of rows in the system memory to service the memory access request; and
   speculatively directing the system memory to continue to energize a Row Address Strobe for said selected row following said access based upon said historical information indicated by said access history mechanism, wherein said step of speculatively continuing to energize said selected row comprises speculatively continuing to energize said Row Address Strobe for said selected row based upon historical information recorded by another memory controller.

14. The method of claim 13, wherein said maintaining comprises maintaining a respective memory access history for each of a plurality of threads executing within said data processing system.

15. The method of claim 13, wherein said plurality of rows in said system memory are arranged in a plurality of banks, and wherein said maintaining comprises maintaining said historical information of said access history mechanism on a per-bank basis.

16. The method of claim 13, wherein said plurality of rows are organized in one or more banks, and wherein said step of speculatively continuing to energize said selected row comprises speculatively continuing to energize said Row Address Strobe for said selected row until a next access to another row within a same bank as said selected row.

17. The method of claim 13, wherein said maintaining comprises maintaining one or more state machines each having a plurality of different states, wherein each of said plurality of different states represents a prediction regarding whether the system memory should continue to energize a Row Address Strobe of said selected row of said system memory following an access.

* * * * *